US011962100B2

(12) United States Patent
Cheng et al.

(10) Patent No.: US 11,962,100 B2
(45) Date of Patent: Apr. 16, 2024

(54) DUAL-BAND ANTENNA MODULE

(71) Applicant: Taiwan Inpaq electronic Co., Ltd., Miaoli County (TW)

(72) Inventors: Ta-Fu Cheng, Miaoli County (TW); Shou-Jen Li, New Taipei (TW); Cheng-Yi Wang, New Taipei (TW); Chih-Ming Su, Taipei (TW)

(73) Assignee: Taiwan Inpaq electronic Co., Ltd., Miaoli County (TW)

( * ) Notice: Subject to any disclaimer, the term of this patent is extended or adjusted under 35 U.S.C. 154(b) by 122 days.

(21) Appl. No.: 17/882,593

(22) Filed: Aug. 7, 2022

(65) Prior Publication Data

US 2023/0361468 A1 Nov. 9, 2023

(30) Foreign Application Priority Data

May 3, 2022 (TW) .................................. 111116599

(51) Int. Cl.
*H01Q 5/307* (2015.01)
*H01Q 1/38* (2006.01)
*H01Q 1/48* (2006.01)

(52) U.S. Cl.
CPC ............... *H01Q 5/307* (2015.01); *H01Q 1/48* (2013.01)

(58) Field of Classification Search
CPC ........ H01Q 1/38; H01Q 9/0407; H01Q 1/243; H01Q 1/2283; H01Q 1/48; H01Q 21/28; H01Q 9/0421; H01Q 21/065; H01Q 9/42
See application file for complete search history.

(56) References Cited

U.S. PATENT DOCUMENTS

| | | | | |
|---|---|---|---|---|
| 2018/0159203 | A1* | 6/2018 | Baks | H01Q 9/045 |
| 2018/0182556 | A1* | 6/2018 | Linn | H01Q 13/103 |
| 2018/0290356 | A1* | 10/2018 | Isohätälä | H01F 41/04 |
| 2018/0294558 | A1* | 10/2018 | Hoang | H01Q 9/42 |
| 2019/0319347 | A1* | 10/2019 | Fang | H01L 23/3128 |
| 2019/0334239 | A1* | 10/2019 | Chou | H01Q 1/24 |
| 2022/0200166 | A1* | 6/2022 | We | H01Q 21/065 |
| 2022/0376398 | A1* | 11/2022 | Chiang | H01Q 9/0435 |

* cited by examiner

*Primary Examiner* — Wei (Victor) Y Chan
(74) *Attorney, Agent, or Firm* — Li & Cai Intellectual Property Office

(57) ABSTRACT

A dual-band antenna module includes a first antenna structure and a second antenna structure. The first antenna structure includes a first insulating substrate, a conductive metal layer, a plurality of grounding supports, and a first feeding pin. The second antenna structure includes a second insulating substrate, a top metal layer, a bottom metal layer, and a second feeding pin. The conductive metal layer is disposed on the first insulating substrate. The grounding supports are configured for supporting the first insulating substrate. The second insulating substrate is disposed above the first insulating substrate. The top metal layer and the bottom metal layer are respectively disposed on a top side and a bottom side of the second insulating substrate. The first frequency band signal transmitted or received by the first antenna structure is smaller than the second frequency band signal transmitted or received by the second antenna structure.

9 Claims, 21 Drawing Sheets

DUAL-BAND ANTENNA MODULE

CROSS-REFERENCE TO RELATED PATENT APPLICATION

This application claims the benefit of priority to Taiwan Patent Application No. 111116599, filed on May 3, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna module, and more particularly to a dual-band antenna module.

BACKGROUND OF THE DISCLOSURE

In the related art, a stacked-type antenna is manufactured by stacking antenna structures on a circuit board. However, an antenna substrate applied to the stacked-type antenna has a problem of excessive weight due to the stacking requirement of the antenna structures.

SUMMARY OF THE DISCLOSURE

In response to the above-referenced technical inadequacy, the present disclosure provides a dual-band antenna module.

In one aspect, the present disclosure provides a dual-band antenna module, which includes a first antenna structure and a second antenna structure. The first antenna structure includes a first insulating substrate, a conductive metal layer, a plurality of grounding supports, and a first feeding pin. The second antenna structure includes a second insulating substrate, a top metal layer, a bottom metal layer and a second feeding pin. The conductive metal layer is disposed on a top side of the first insulating substrate, the grounding supports are configured to support the first insulating substrate and separate from the conductive metal layer, and the first feeding pin passes through the first insulating substrate and is separate from the conductive metal layer. The second insulating substrate is disposed above the first insulating substrate, the top metal layer is disposed on a top side of the second insulating substrate, the bottom metal layer is disposed on a bottom side of the second insulating substrate and separate from the conductive metal layer, and the second feeding pin passes through the second insulating substrate and the first insulating substrate and is separate from the top metal layer, the bottom metal layer and the conductive metal layer. The first antenna structure is configured for transmitting or receiving a first frequency band signal, the second antenna structure is configured for transmitting or receiving a second frequency band signal, and the first frequency band signal that is transmitted or received by the first antenna structure is smaller than the second frequency band signal that is transmitted or received by the second antenna structure.

In another aspect, the present disclosure provides a dual-band antenna module, which includes a first antenna structure and a second antenna structure. The first antenna structure includes a first insulating substrate, a conductive metal layer, a plurality of grounding supports, and a first feeding pin. The second antenna structure includes a second insulating substrate, a top metal layer, a bottom metal layer, a second feeding pin, an auxiliary conductive element and a coupling metal layer. The conductive metal layer is disposed on a top side of the first insulating substrate, the grounding supports are configured to support the first insulating substrate and separate from the conductive metal layer, and the first feeding pin passes through the first insulating substrate and is separate from the conductive metal layer. The second insulating substrate is disposed above the first insulating substrate, the top metal layer is disposed on a top side of the second insulating substrate, the bottom metal layer is disposed on a bottom side of the second insulating substrate to contact the conductive metal layer, the coupling metal layer is disposed on a lateral side of the second insulating substrate and is separate from the top metal layer and the bottom metal layer, the auxiliary conductive element penetrates through the first insulating substrate and is separate from the conductive metal layer, and the second feeding pin is disposed on a bottom side of the first insulating substrate and is electrically connected to the coupling metal layer through the auxiliary conductive element. The first antenna structure is configured for transmitting or receiving a first frequency band signal, the second antenna structure is configured for transmitting or receiving a second frequency band signal, and the first frequency band signal that is transmitted or received by the first antenna structure is smaller than the second frequency band signal that is transmitted or received by the second antenna structure.

In yet another aspect, the present disclosure provides a dual-band antenna module, which includes a first antenna structure and a second antenna structure. The first antenna structure includes a first insulating substrate, a conductive metal layer, a plurality of grounding supports, and two first feeding pins. The second antenna structure includes a second insulating substrate, a top metal layer, a bottom metal layer, a second feeding pin, two auxiliary conductive elements and two coupling metal layers. The conductive metal layer is disposed on a top side of the first insulating substrate, the grounding supports are configured to support the first insulating substrate and separate from the conductive metal layer, and the two first feeding pins are disposed on a bottom side of the first insulating substrate and separate from the conductive metal layer. The second insulating substrate is disposed above the first insulating substrate, the top metal layer is disposed on a top side of the second insulating substrate, the bottom metal layer is disposed on a bottom side of the second insulating substrate to contact the conductive metal layer, the two coupling metal layers are respectively disposed on two lateral sides of the second insulating substrate and are separate from the top metal layer and the bottom metal layer, each of the two auxiliary conductive elements penetrates through the first insulating substrate and is separate from the conductive metal layer, and the second feeding pin is disposed on the bottom side of the first insulating substrate and is electrically connected to the two coupling metal layers through the two auxiliary conductive elements, respectively. The first antenna structure is configured for transmitting or receiving a first frequency band signal, the second antenna structure is configured for transmitting or receiving a second frequency band signal, and the first frequency band signal that is transmitted or received by the first antenna structure is smaller than the second frequency band signal that is transmitted or received by the second antenna structure.

Therefore, in the dual-band antenna module provided by the present disclosure, by virtue of the grounding supports being configured to support the first insulating substrate and separate from the conductive metal layer, and the first frequency band signal that is transmitted or received by the first antenna structure being smaller than the second frequency band signal that is transmitted or received by the second antenna structure, the dual-band antenna module can provide a high frequency mode and a low frequency mode at the same time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
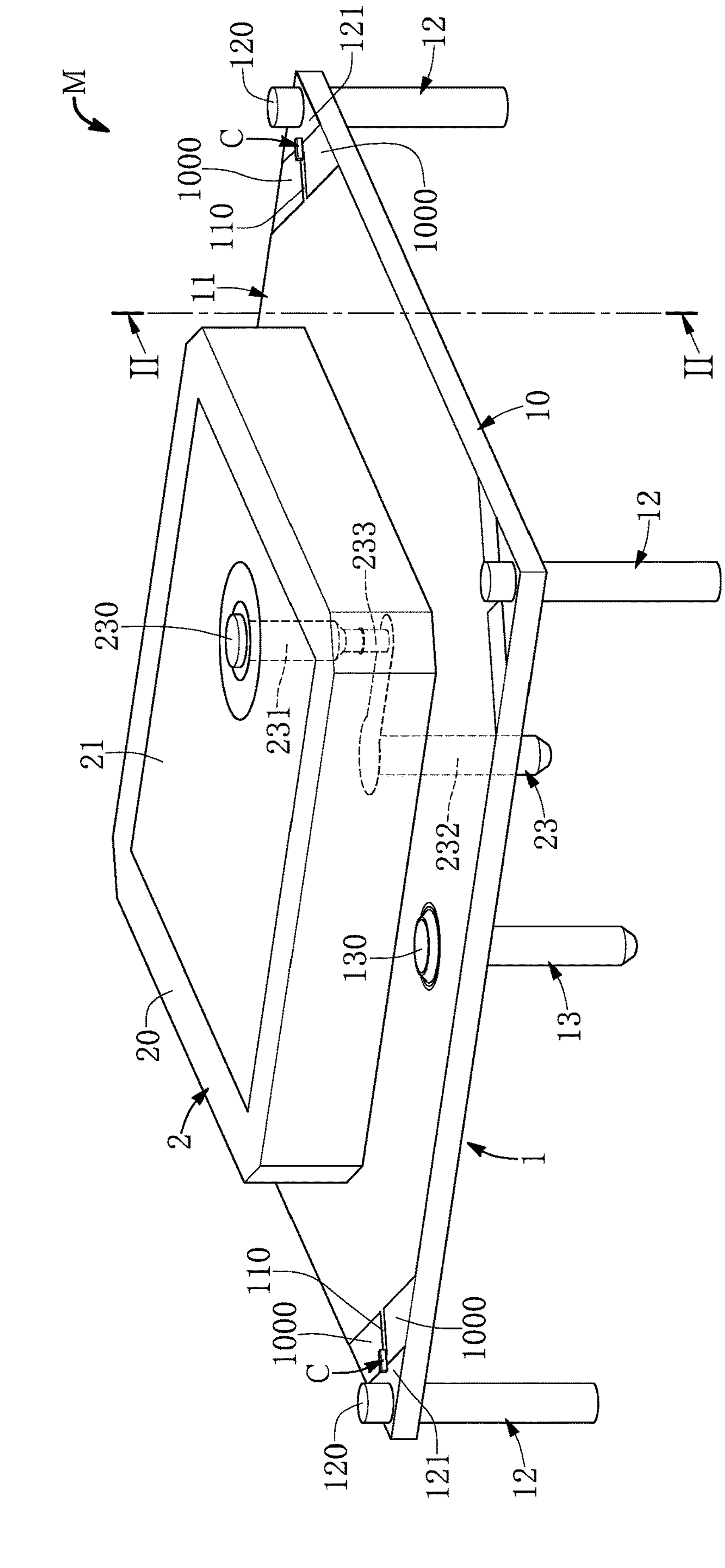
FIG. 1 is a schematic perspective view of a dual-band antenna module according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

First Embodiment

Figure 2:
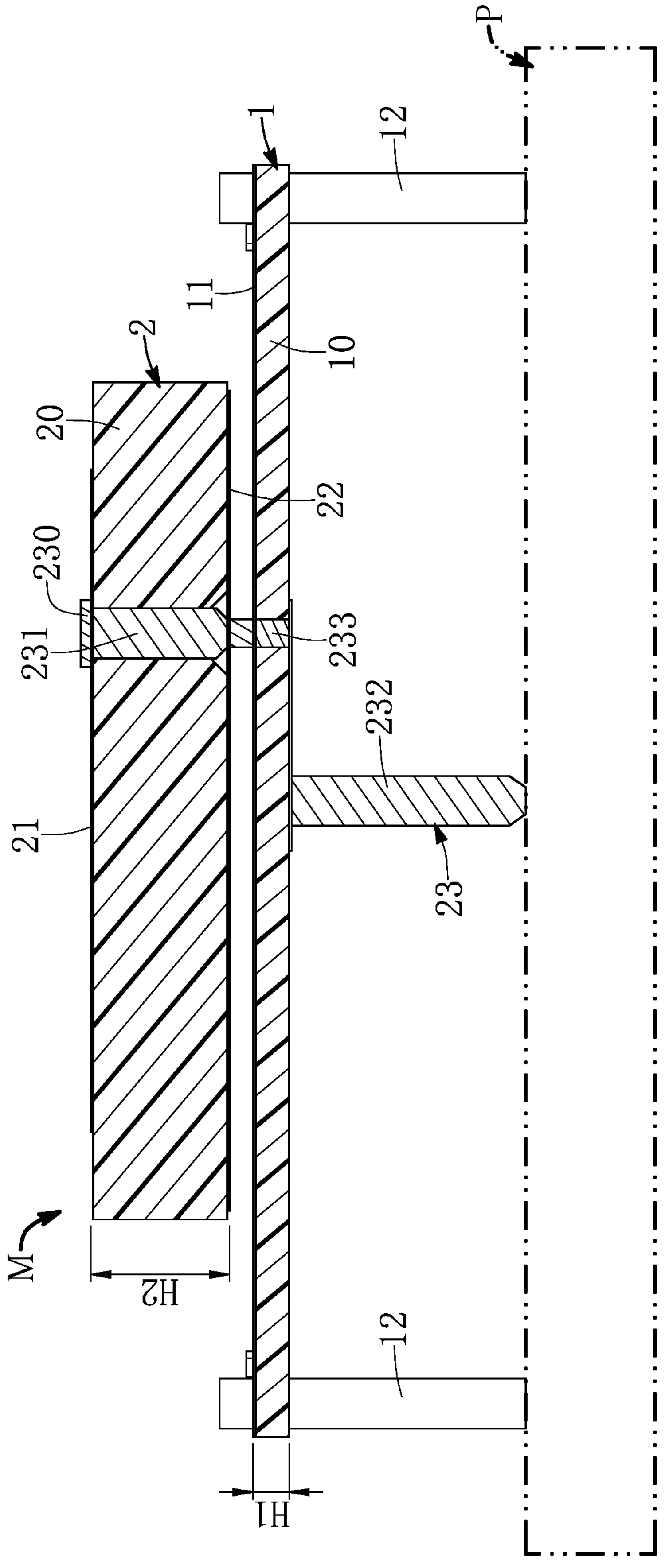
FIG. 2 is a schematic cross-sectional view taken along line II-II of FIG. 1.
Figure 3:
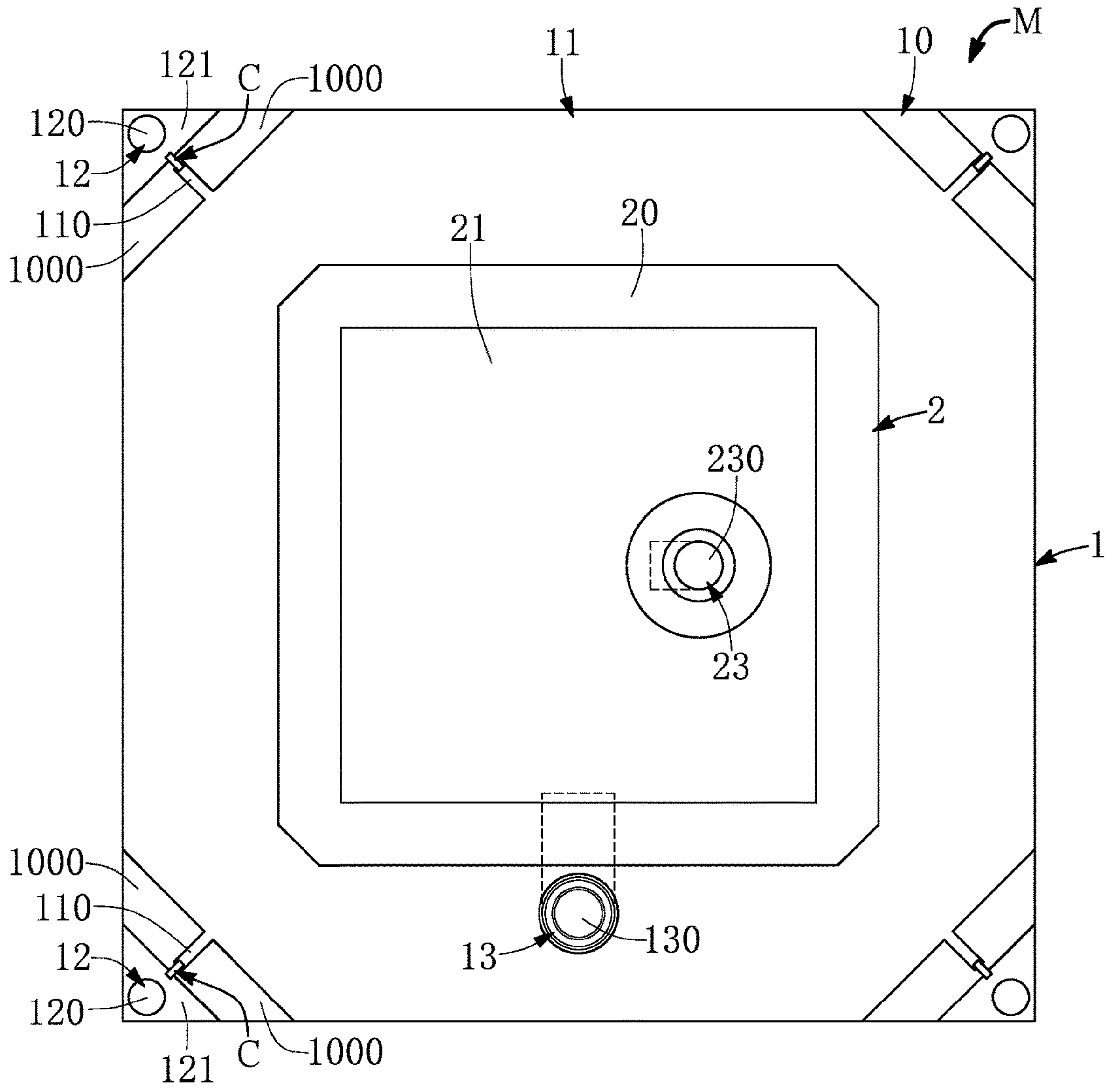
FIG. 3 is a schematic top view of the dual-band antenna module according to the first embodiment of the present disclosure.

Referring to FIG. 1 to FIG. 3, a first embodiment of the present disclosure provides a dual-band antenna module M, which includes a first antenna structure 1 (such as a linearly polarized antenna, a left-hand circularly polarized antenna, or a right-handed circularly polarized antenna) and a second antenna structure 2. The first antenna structure 1 includes a first insulating substrate 10, a conductive metal layer 11 (or an antenna radiator or an electrode surface), a plurality of grounding supports 12, and a first feeding pin 13 (or a first antenna signal feeding pin), and the second antenna structure 2 includes a second insulating substrate 20, a top metal layer 21 (or top antenna radiator or a top electrode surface), a bottom metal layer 22 (or a bottom antenna radiator or a bottom electrode surface) and a second feeding pin 23 (or a second antenna signal feeding pin). Therefore, the first antenna structure 1 can be configured for transmitting or receiving a first frequency band signal (such as the signal in the frequency band between 1163 MHz and 1229 MHz), the second antenna structure 2 can be configured for transmitting or receiving a second frequency band signal (such as the signal in the frequency band between 1557 MHz and 1607 MHz), and the first frequency band signal (i.e., a low frequency mode provided by the first antenna structure 1) that is transmitted or received by the first antenna structure 1 is smaller than the second frequency band signal (i.e., a high frequency mode provided by the first antenna structure 1) that is transmitted or received by the second antenna structure 2. However, the aforementioned details are disclosed for exemplary purposes only, and are not meant to limit the scope of the present disclosure.

More particularly, referring to FIG. 1 to FIG. 3, the conductive metal layer 11 is disposed on a top side of the first insulating substrate 10, the grounding supports 12 are configured to support the first insulating substrate 10 and are separate from the conductive metal layer 11, and the first feeding pin 13 passes through the first insulating substrate 10 and is separate from the conductive metal layer 11. Moreover, the second insulating substrate 20 is disposed above the first insulating substrate 10, the top metal layer 21 is disposed on a top side of the second insulating substrate 20, the bottom metal layer 22 is disposed on a bottom side of the second insulating substrate 20 and separate from the conductive metal layer 11, and the second feeding pin 23 passes through the second insulating substrate 20 and the first insulating substrate 10 and is separate from the top metal layer 21, the bottom metal layer 22 and the conductive metal layer 11. It should be noted that the grounding supports 12 can be configured for reducing frequency (frequency reduction).

For example, referring to FIG. 1 and FIG. 2, a thickness H1 (such as a thickness between 0.4 mm and 2 mm) of the first insulating substrate 10 of the first antenna structure 1 can be substantially equal to ⅓ to ⅒ of a thickness H2 of the second insulating substrate 20 of the second antenna structure 2, and a permittivity of the first insulating substrate 10 (such as any type of antenna carrier substrate that can be used to carry an antenna) of the first antenna structure 1 can be substantially smaller than a permittivity of the second insulating substrate 20 (such as any type of antenna carrier substrate that can be used to carry an antenna) of the second antenna structure 2. In addition, when the dual-band antenna module M is disposed on a circuit substrate P, the first feeding pin 13, the second feeding pin 23 and the grounding supports 12 are electrically connected to the circuit substrate P. Moreover, the grounding supports 12 are disposed between the first insulating substrate 10 and the circuit substrate P, the first insulating substrate 10 can be suspended (or supported, or elevated) above the circuit substrate P by support of the grounding supports 12 so as to separate the first insulating substrate 10 and the circuit substrate P from each other by a predetermined distance, and the second insulating substrate 20 can be suspended (or supported, or elevated) above the first insulating substrate 10 by support of the second feeding pins 23 so as to separate the second insulating substrate 20 and the first insulating substrate 10 from each other by a predetermined distance. However, the aforementioned details are disclosed for exemplary purposes only, and are not meant to limit the scope of the present disclosure.

For example, referring to FIG. 1 and FIG. 2, the second feeding pin 23 includes a first conductive portion 231, a second conductive portion 232 and a third conductive portion 233. The first conductive portion 231 penetrates through the second insulating substrate 20 and is separate from the top metal layer 21 and the bottom metal layer 22, the second conductive portion 232 is disposed below the first insulating substrate 10 and is separate from the conductive metal layer 11, and the third conductive portion 233 penetrates through the first insulating substrate 10 and is electrically connected between the first conductive portion 231 and the second conductive portion 232. It should be noted that the second insulating substrate 20 can be suspended (or supported, or elevated) above the first insulating substrate 10 by support of the first conductive portion 231 of the second feeding pins 23 so as to separate the second insulating substrate 20 and the first insulating substrate 10 from each other by a predetermined distance. However, the aforementioned details are disclosed for exemplary purposes only, and are not meant to limit the scope of the present disclosure.

For example, referring to FIG. 1 and FIG. 3, the first antenna structure 1 includes a plurality of matching elements C (such as inductors or capacitors) disposed on the top side of the first insulating substrate 10, and each of the matching elements C is electrically connected between the conductive metal layer 11 and a corresponding one of the grounding supports 12, so that the center frequency of the antenna is matched (it is worth noting that the matching element C can be configured to reduce the frequency). In addition, the grounding supports 12 respectively and electrically contact a plurality of auxiliary conductive layers 121 that are disposed on the top side of the first insulating substrate 10, and each of the grounding supports 12 is electrically connected to a corresponding one of the matching elements C through the auxiliary conductive layer 121. Moreover, the conductive metal layer 11 has a plurality of conductive extending portions 110 respectively corresponding to the grounding supports 12, and the conductive metal layer 11 is electrically connected to the matching elements C through the conductive extending portions 110 respectively. It should be noted that the first insulating substrate 10 has a plurality of unoccupied areas 1000 formed on the top side thereof, each of the unoccupied areas 1000 is formed between the conductive metal layer 11 and a corresponding one of the auxiliary conductive layers 121, and each of the conductive extending portions 110 of the conductive metal layer 11 is disposed between two adjacent ones of the unoccupied areas 1000. Furthermore, a top exposed portion 120 of each of the grounding supports 12 is exposed from the top side of the first insulating substrate 10, the first feeding pin 13 has a first exposed portion 130 exposed from the top side of the first insulating substrate 10, and the second feeding pin 23 has a second exposed portion 230 exposed from the top side of the second insulating substrate 20. However, the aforementioned details are disclosed for exemplary purposes only, and are not meant to limit the scope of the present disclosure.

Second Embodiment

Referring to FIG. 4 to FIG. 9, a second embodiment of the present disclosure provides a dual-band antenna module M, which includes a first antenna structure 1 (such as a linearly polarized antenna, a left-hand circularly polarized antenna, or a right-handed circularly polarized antenna) and a second antenna structure 2. Therefore, the first antenna structure 1 can be configured for transmitting or receiving a first frequency band signal (such as the signal in the frequency band between 1163 MHz and 1229 MHz), the second antenna structure 2 can be configured for transmitting or receiving a second frequency band signal (such as the signal in the frequency band between 1557 MHz and 1607 MHz), and the first frequency band signal (i.e., a low frequency mode provided by the first antenna structure 1) that is transmitted or received by the first antenna structure 1 is smaller than the second frequency band signal (i.e., a high frequency mode provided by the first antenna structure 1) that is transmitted or received by the second antenna structure 2. However, the aforementioned details are disclosed for exemplary purposes only, and are not meant to limit the scope of the present disclosure.

Figure 7:
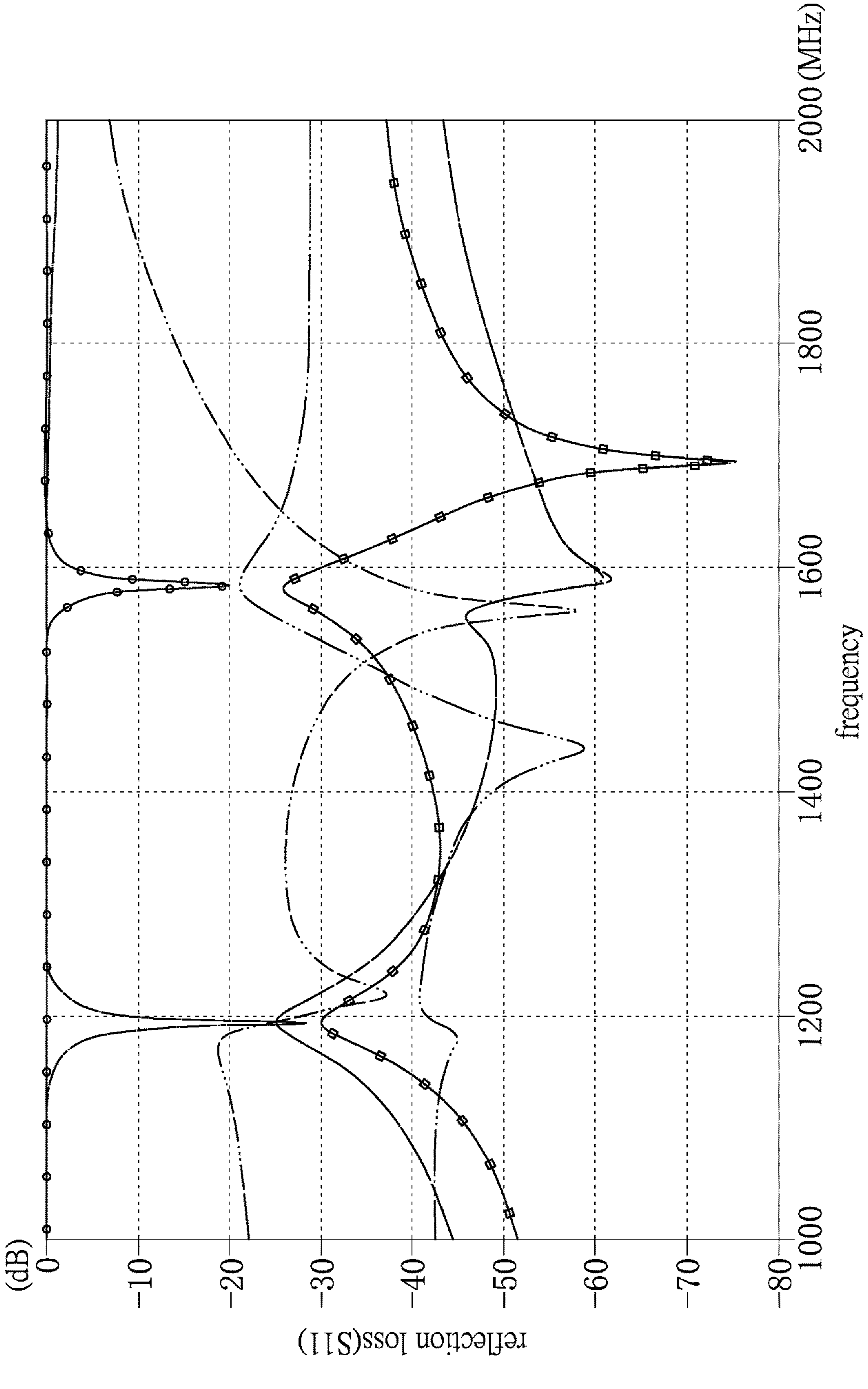
FIG. 7 is a graph of the reflection loss (S11) presented by the dual-band antenna module in the low frequency band and the high frequency band according to the second embodiment of the present disclosure.
Figure 8:
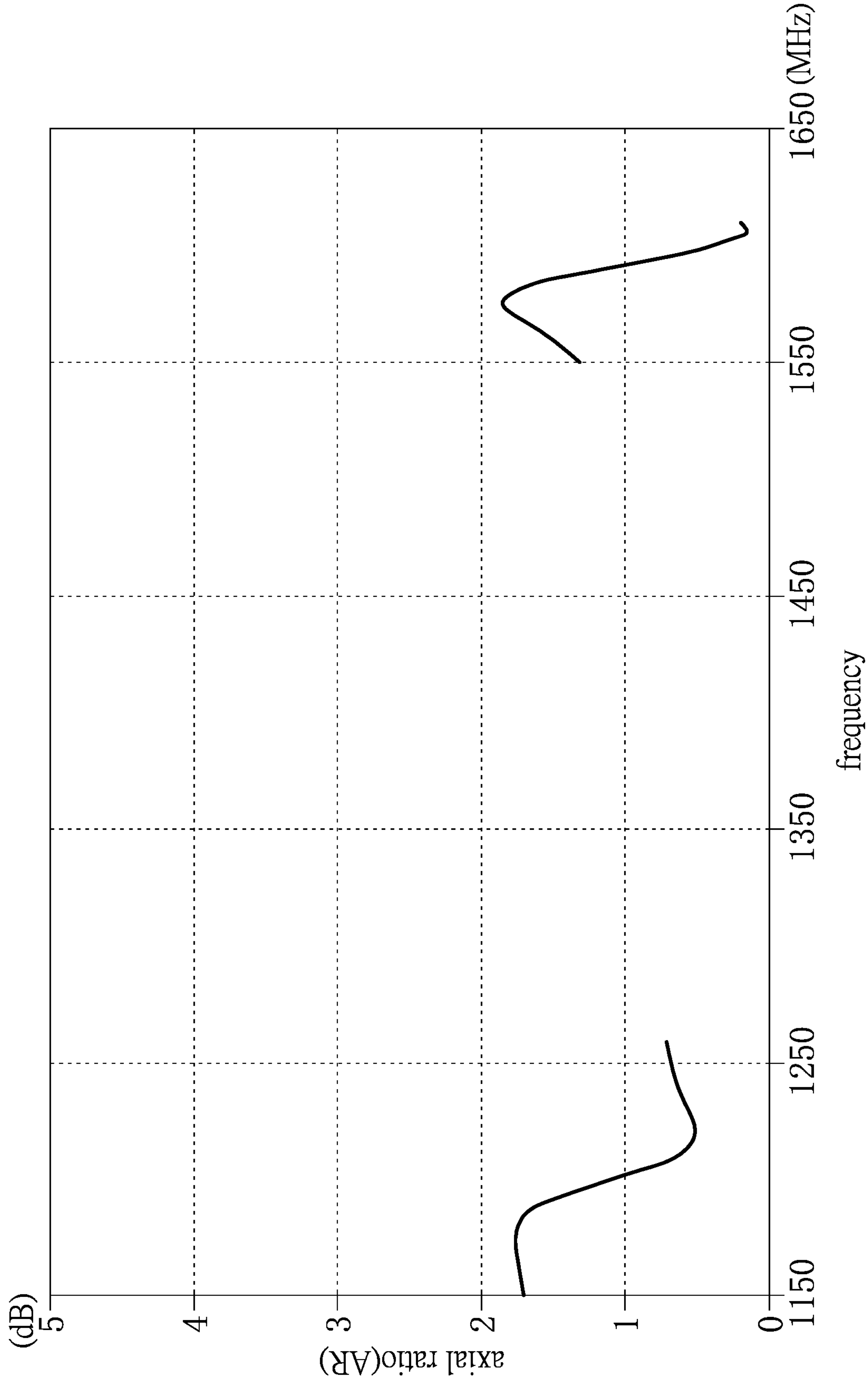
FIG. 8 is a graph of the axial ratio (AR) presented by the dual-band antenna module in the low frequency band and the high frequency band according to the second embodiment of the present disclosure.
Figure 9:
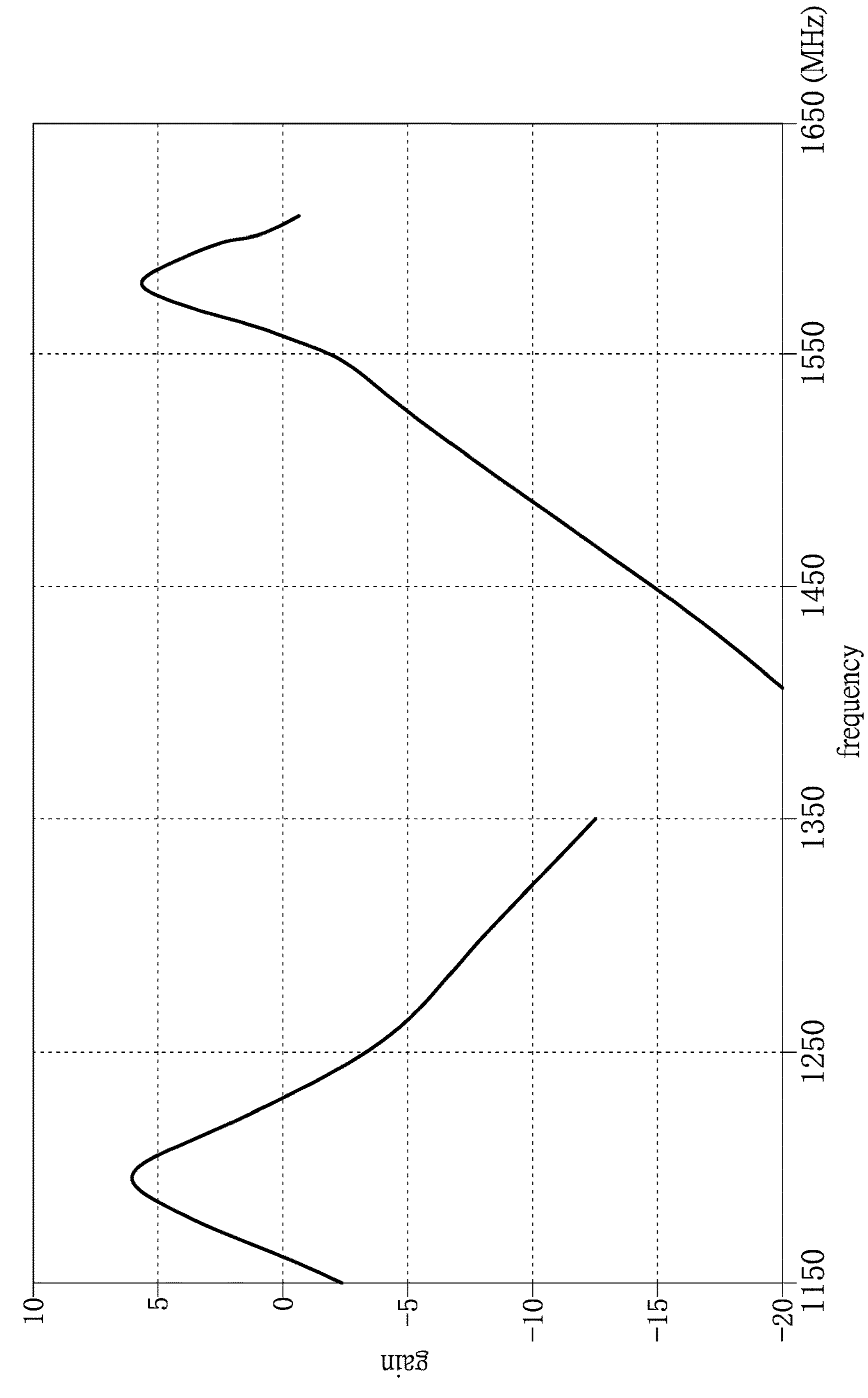
FIG. 9 is a graph of the gain presented by the dual-band antenna module in the low frequency band and the high frequency band according to the second embodiment of the present disclosure.

It should be noted that, as shown in FIG. 7, which is a graph of the reflection loss (S11) in the low-frequency and high-frequency bands presented by the dual-band antenna module M of the second embodiment of the present disclosure, so that the dual-band antenna module M in the low frequency band (i.e., the low operating frequency band such as 1195 MHz) and the high frequency band (i.e., the high operating frequency band such as 1585 MHz) can provide a lower return loss. Furthermore, as shown in FIG. 8, which is a graph of the axial ratio (AR) in the low-frequency and high-frequency bands presented by the dual-band antenna module M of the second embodiment of the present disclosure, so that the dual-band antenna module M in the low frequency band and the high frequency band can provide a lower axial ratio. In addition, as shown in FIG. 9, which is a graph of the gain in the low-frequency and high-frequency bands presented by the dual-band antenna module M of the second embodiment of the present disclosure, so that the dual-band antenna module M in the low frequency band and the high frequency band can provide a higher gain. However, the aforementioned details are disclosed for exemplary purposes only, and are not meant to limit the scope of the present disclosure.

Comparing FIGS. 4 to 6 with FIGS. 1 to 3, the main difference between the second embodiment and the first embodiment is as follows: in the second embodiment, the first antenna structure 1 includes another first feeding pin 13 separate from the first feeding pin 13, and the another first feeding pin 13 passes through the first insulating substrate 10 and is separate from the conductive metal layer 11. In addition, the second antenna structure 2 includes another second feeding pin 23 separate from the second feeding pin 23, and the another second feeding pin 23 passes through the second insulating substrate 20 and the first insulating substrate 10 and is separate from the top metal layer 21, the bottom metal layer 22 and the conductive metal layer 11.

Figure 4:
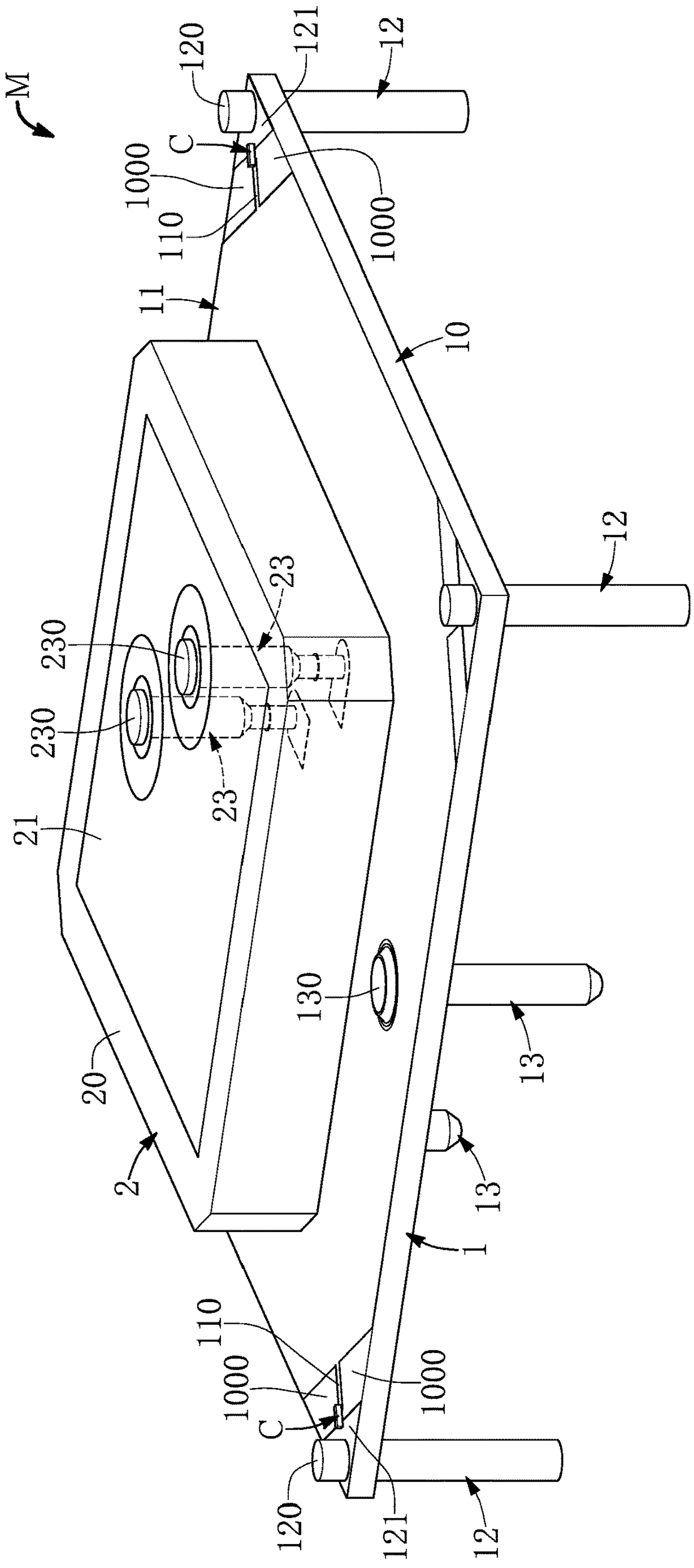
FIG. 4 is a schematic perspective view of the dual-band antenna module according to a second embodiment of the present disclosure.
Figure 5:
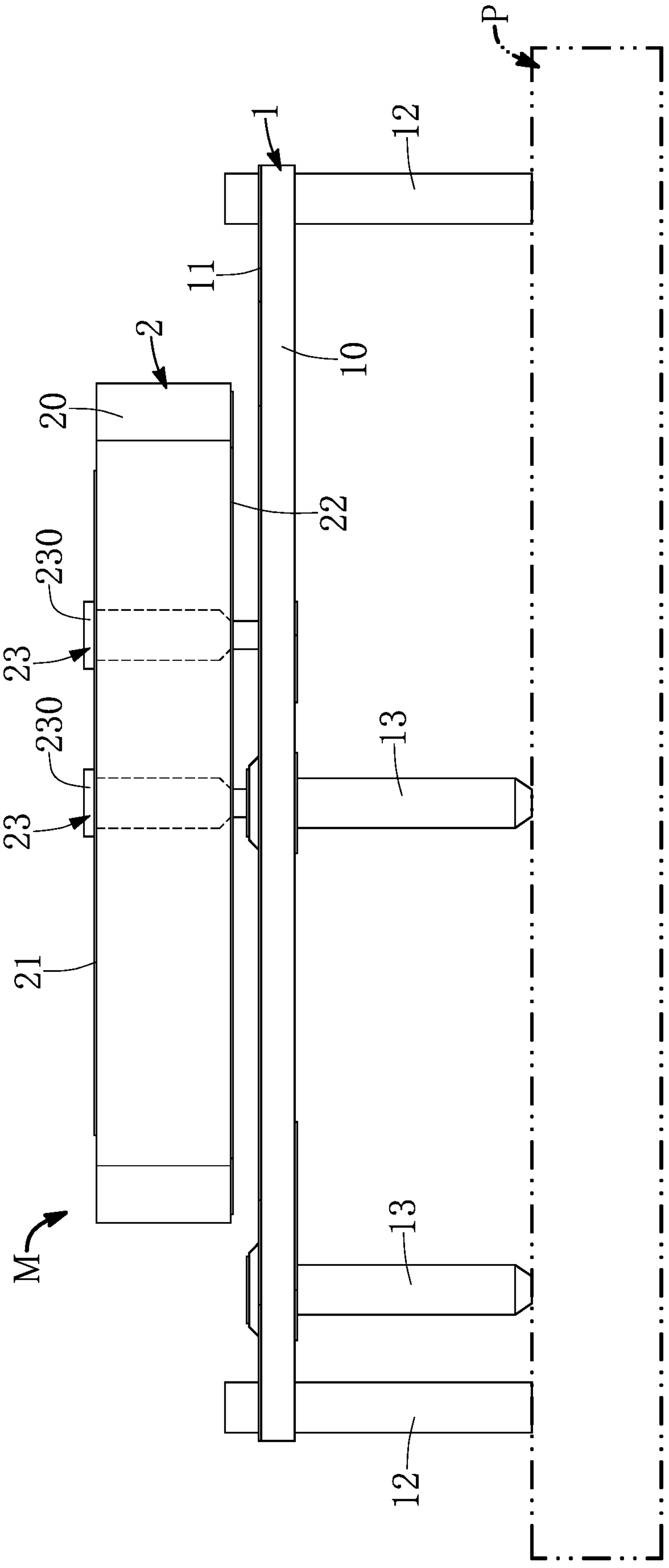
FIG. 5 is a schematic side view of the dual-band antenna module according to the second embodiment of the present disclosure.
Figure 6:
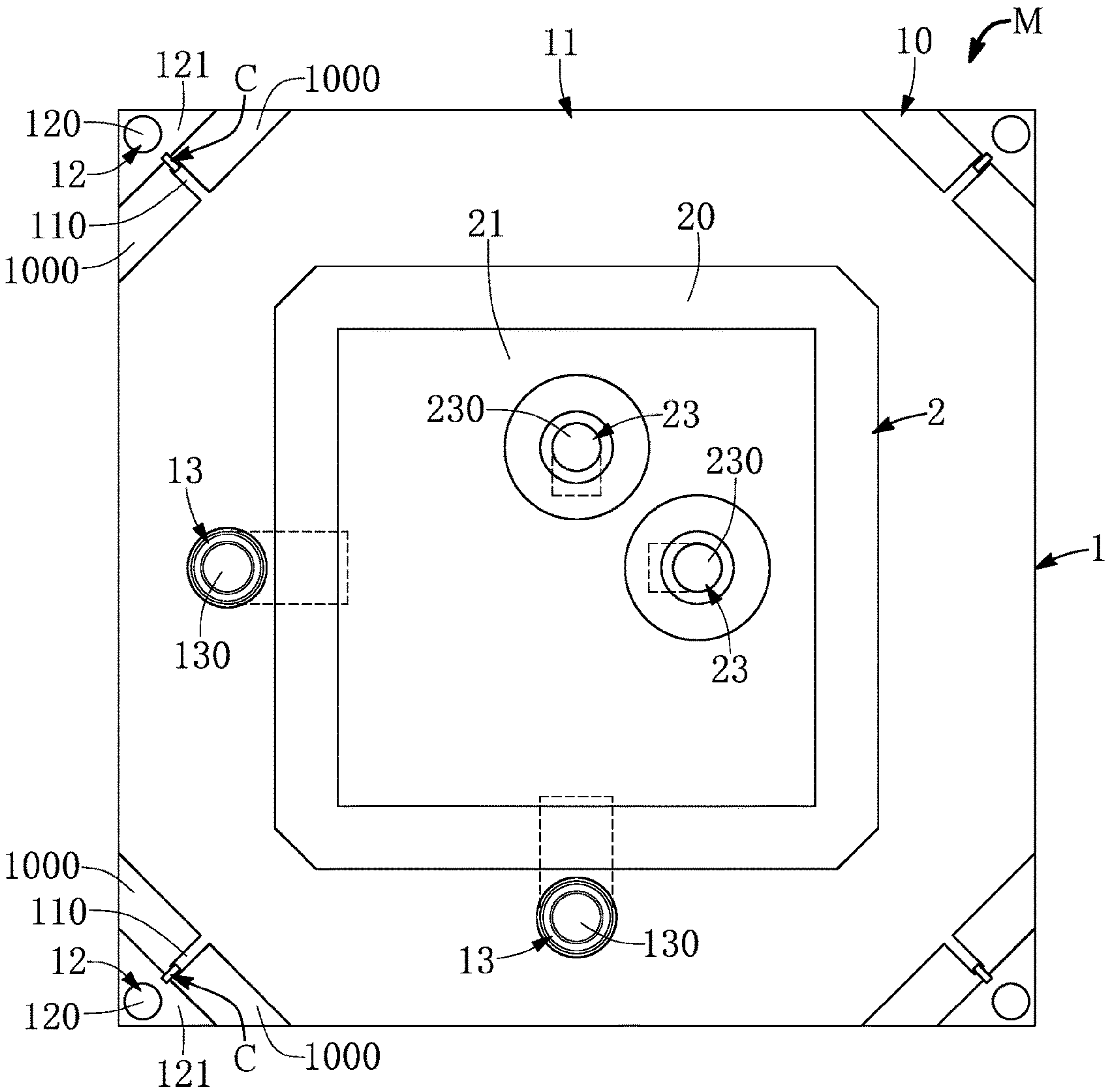
FIG. 6 is a schematic top view of the dual-band antenna module according to the second embodiment of the present disclosure.

More particularly, referring to FIG. 4 to FIG. 6, when the dual-band antenna module M is disposed on a circuit substrate P, the two first feeding pins 13, the two second feeding pins 23 and the grounding supports 12 are electrically connected to the circuit substrate P. In addition, the second insulating substrate 20 is suspended (or supported, or elevated) above the first insulating substrate 10 by support of the two second feeding pins 23 so as to separate the second insulating substrate 20 and the first insulating substrate 10 from each other by a predetermined distance. Moreover, each of the second feeding pins 23 pass through the second insulating substrate 20 and the first insulating substrate 10, and a bottom portion of each of the two second feeding pins 23 is exposed from the first insulating substrate 10. Furthermore, each of the two first feeding pins 13 has a first exposed portion 130 exposed from the top side of the first insulating substrate 10, and each of the two second feeding pins 23 has a second exposed portion 230 exposed from the top side of the second insulating substrate 20. However, the aforementioned details are disclosed for exemplary purposes only, and are not meant to limit the scope of the present disclosure.

Third Embodiment

Figure 10:
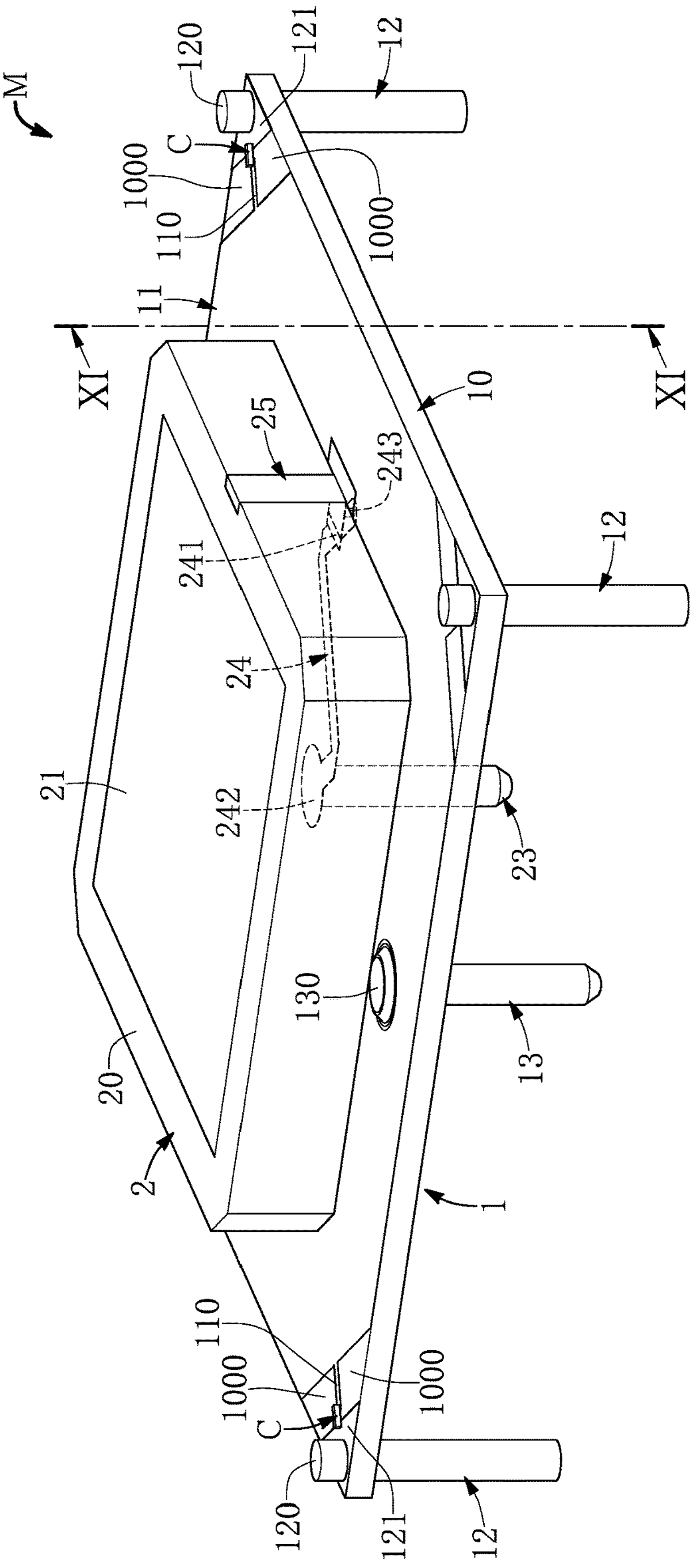
FIG. 10 is a schematic perspective view of the dual-band antenna module according to a third embodiment of the present disclosure.
Figure 11:
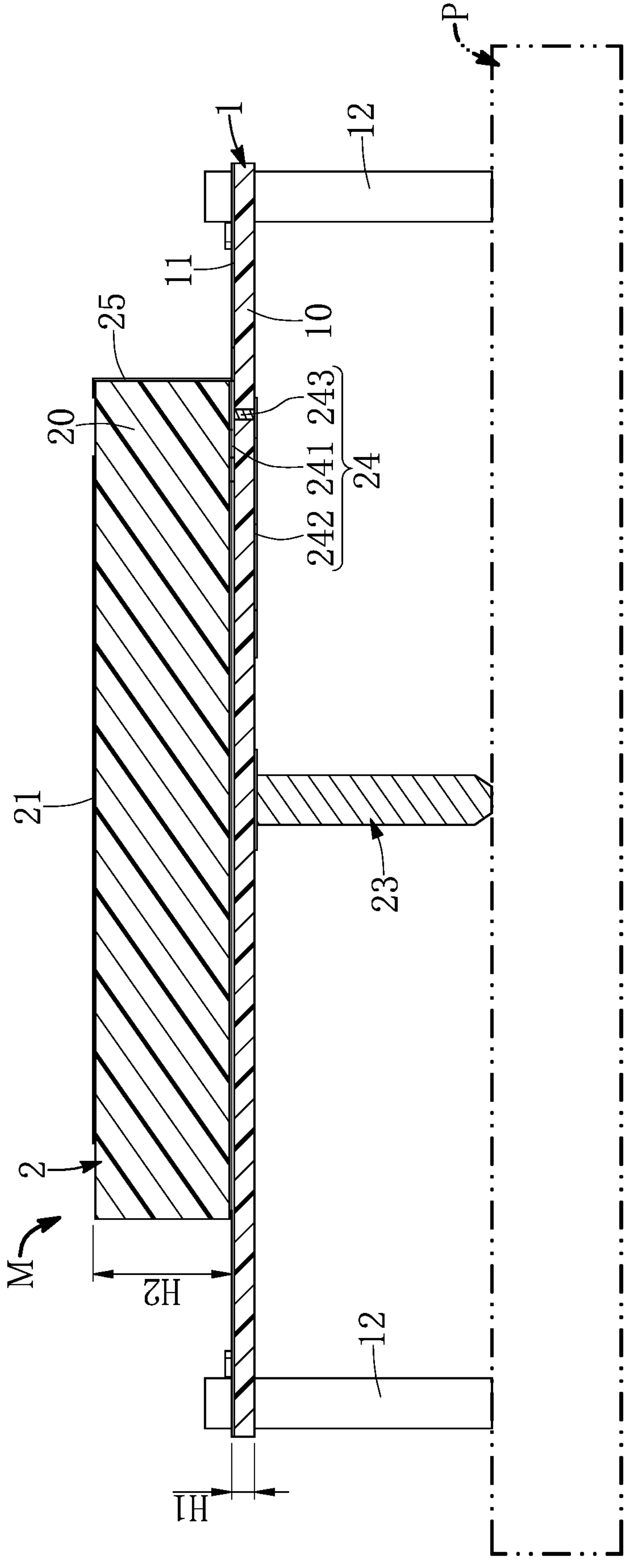
FIG. 11 is a schematic cross-sectional view taken along line XI-XI of FIG. 10.
Figure 12:
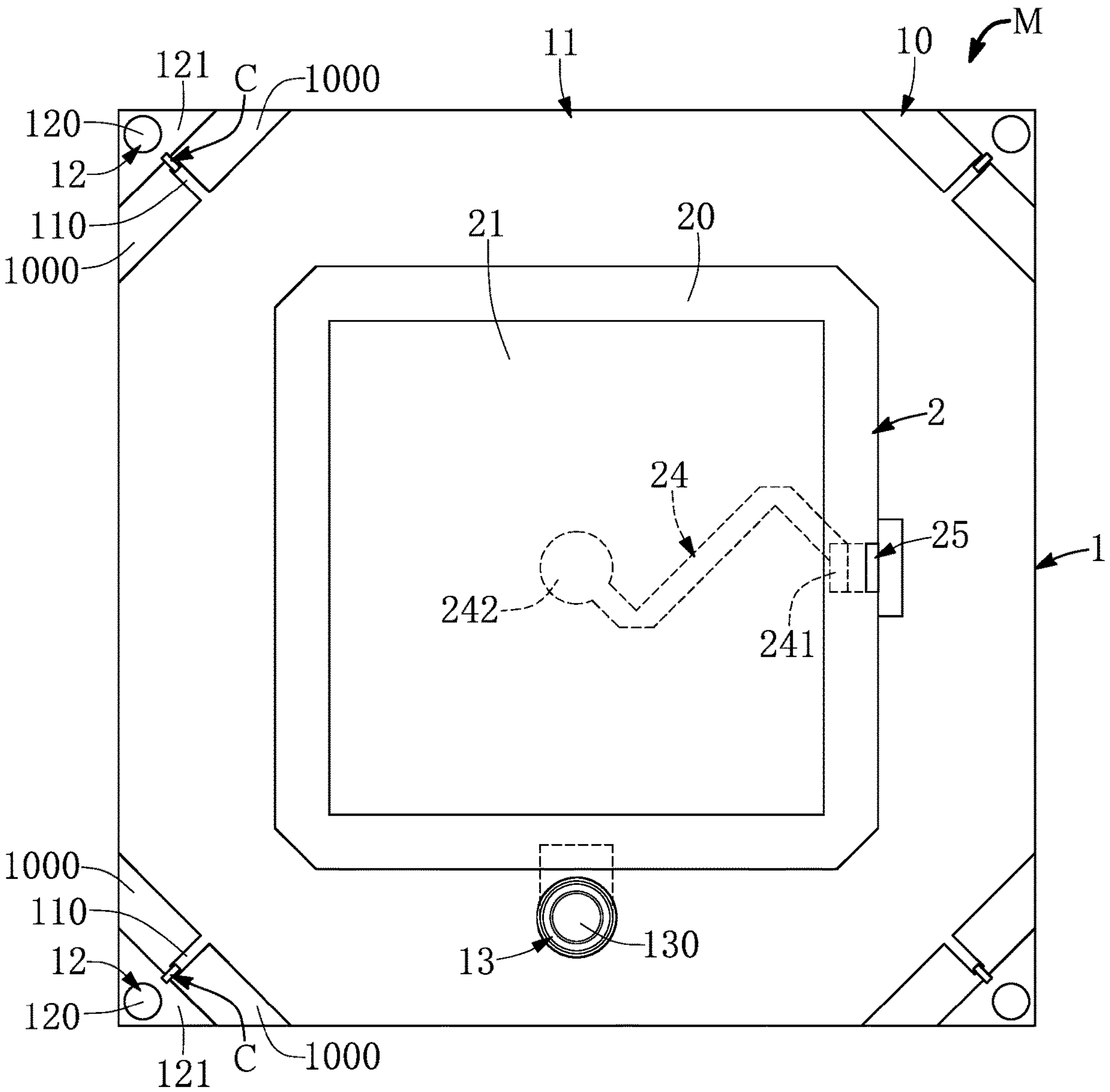
FIG. 12 is a schematic top view of the dual-band antenna module according to the third embodiment of the present disclosure.

Referring to FIG. 10 to FIG. 12, a third embodiment of the present disclosure provides a dual-band antenna module M, which includes a first antenna structure 1 (such as a linearly polarized antenna, a left-hand circularly polarized antenna, or a right-handed circularly polarized antenna) and a second antenna structure 2. The first antenna structure 1 includes a first insulating substrate 10, a conductive metal layer 11, a plurality of grounding supports 12, and a first feeding pin 13, and the second antenna structure 2 includes a second insulating substrate 20, a top metal layer 21, a bottom metal layer 22, a second feeding pin 23, an auxiliary conductive element 24 and a coupling metal layer 25. Therefore, the first antenna structure 1 can be configured for transmitting or receiving a first frequency band signal (such as the signal in the frequency band between 1163 MHz and 1229 MHz), the second antenna structure 2 can be configured for transmitting or receiving a second frequency band signal (such as the signal in the frequency band between 1557 MHz and 1607 MHz), and the first frequency band signal (i.e., a low frequency mode provided by the first antenna structure 1) that is transmitted or received by the first antenna structure 1 is smaller than the second frequency band signal (i.e., a high frequency mode provided by the first antenna structure 1) that is transmitted or received by the second antenna structure 2. However, the aforementioned details are disclosed for exemplary purposes only, and are not meant to limit the scope of the present disclosure.

More particularly, referring to FIG. 10 to FIG. 12, the conductive metal layer 11 is disposed on a top side of the first insulating substrate 10, the grounding supports 12 are configured to support the first insulating substrate 10 and are separate from the conductive metal layer 11, and the first feeding pin 13 passes through the first insulating substrate 10 and is separate from the conductive metal layer 11. Furthermore, the second insulating substrate 20 is disposed above the first insulating substrate 10, the top metal layer 21 is disposed on a top side of the second insulating substrate 20, the bottom metal layer 22 is disposed on a bottom side of the second insulating substrate 20 to contact the conductive metal layer 11, the coupling metal layer 25 is disposed on a lateral side of the second insulating substrate 20 and is separate from the top metal layer 21 and the bottom metal layer 22, the auxiliary conductive element 24 penetrates through the first insulating substrate 10 and is separate from the conductive metal layer 11, and the second feeding pin 23 is disposed on a bottom side of the first insulating substrate 10 and is electrically connected to the coupling metal layer 25 through the auxiliary conductive element 24.

For example, referring to FIG. 10 and FIG. 11, a thickness H1 (such as a thickness between 0.4 mm and 2 mm) of the first insulating substrate 10 of the first antenna structure 1 can be substantially equal to ⅓ to $\frac{1}{10}$ of a thickness H2 of the second insulating substrate 20 of the second antenna structure 2, and a permittivity of the first insulating substrate 10 (such as any type of antenna carrier substrate that can be used to carry an antenna) of the first antenna structure 1 can be substantially smaller than a permittivity of the second insulating substrate 20 (such as any type of antenna carrier substrate that can be used to carry an antenna) of the second antenna structure 2. In addition, when the dual-band antenna module M is disposed on a circuit substrate P, the first feeding pin 13, the second feeding pin 23 and the grounding supports 12 are electrically connected to the circuit substrate P. Moreover, the grounding supports 12 are disposed between the first insulating substrate 10 and the circuit substrate P, and the first insulating substrate 10 can be suspended (or supported, or elevated) above the circuit substrate P by support of the grounding supports 12 so as to separate the first insulating substrate 10 and the circuit substrate P from each other by a predetermined distance.

However, the aforementioned details are disclosed for exemplary purposes only, and are not meant to limit the scope of the present disclosure.

For example, referring to FIG. 10 and FIG. 11, the coupling metal layer 25 (such as a U-shaped coupling metal layer 25) can extend from the top side of the second insulating substrate 20 to the bottom side of the second insulating substrate 20 so as to electrically contact the auxiliary conductive element 24. In addition, the auxiliary conductive element 24 has a top conductive portion 241, a bottom conductive portion 242 and a conductive penetration portion 243. The top conductive portion 241 is disposed on the top side of the first insulating substrate 10 so as to electrically contact the coupling metal layer 25, the bottom conductive portion 242 is disposed on the bottom side of the first insulating substrate 10 so as to electrically contact the second feeding pin 23, and the conductive penetration portion 243 penetrates the first insulating substrate 10 and is electrically connected between the top conductive portion 241 and the bottom conductive portion 242. However, the aforementioned details are disclosed for exemplary purposes only, and are not meant to limit the scope of the present disclosure.

For example, referring to FIG. 10 and FIG. 12, the first antenna structure 1 includes a plurality of matching elements C (such as inductors or capacitors) disposed on the top side of the first insulating substrate 10, and each of the matching elements C is electrically connected between the conductive metal layer 11 and a corresponding one of the grounding supports 12, so that the center frequency of the antenna is matched (it is worth noting that the matching element C can be configured to reduce the frequency). In addition, the grounding supports 12 respectively and electrically contact a plurality of auxiliary conductive layers 121 that are disposed on the top side of the first insulating substrate 10, and each of the grounding supports 12 is electrically connected to a corresponding one of the matching elements C through the auxiliary conductive layer 121. Moreover, the conductive metal layer 11 has a plurality of conductive extending portions 110 respectively corresponding to the grounding supports 12, and the conductive metal layer 11 is electrically connected to the matching elements C through the conductive extending portions 110 respectively. It should be noted that the first insulating substrate 10 has a plurality of unoccupied areas 1000 formed on the top side thereof, each of the unoccupied areas 1000 is formed between the conductive metal layer 11 and a corresponding one of the auxiliary conductive layers 121, and each of the conductive extending portions 110 of the conductive metal layer 11 is disposed between two adjacent ones of the unoccupied areas 1000. Furthermore, a top exposed portion 120 of each of the grounding supports 12 is exposed from the top side of the first insulating substrate 10, and the first feeding pin 13 has a first exposed portion 130 exposed from the top side of the first insulating substrate 10. However, the aforementioned details are disclosed for exemplary purposes only, and are not meant to limit the scope of the present disclosure.

Fourth Embodiment

Figure 13:
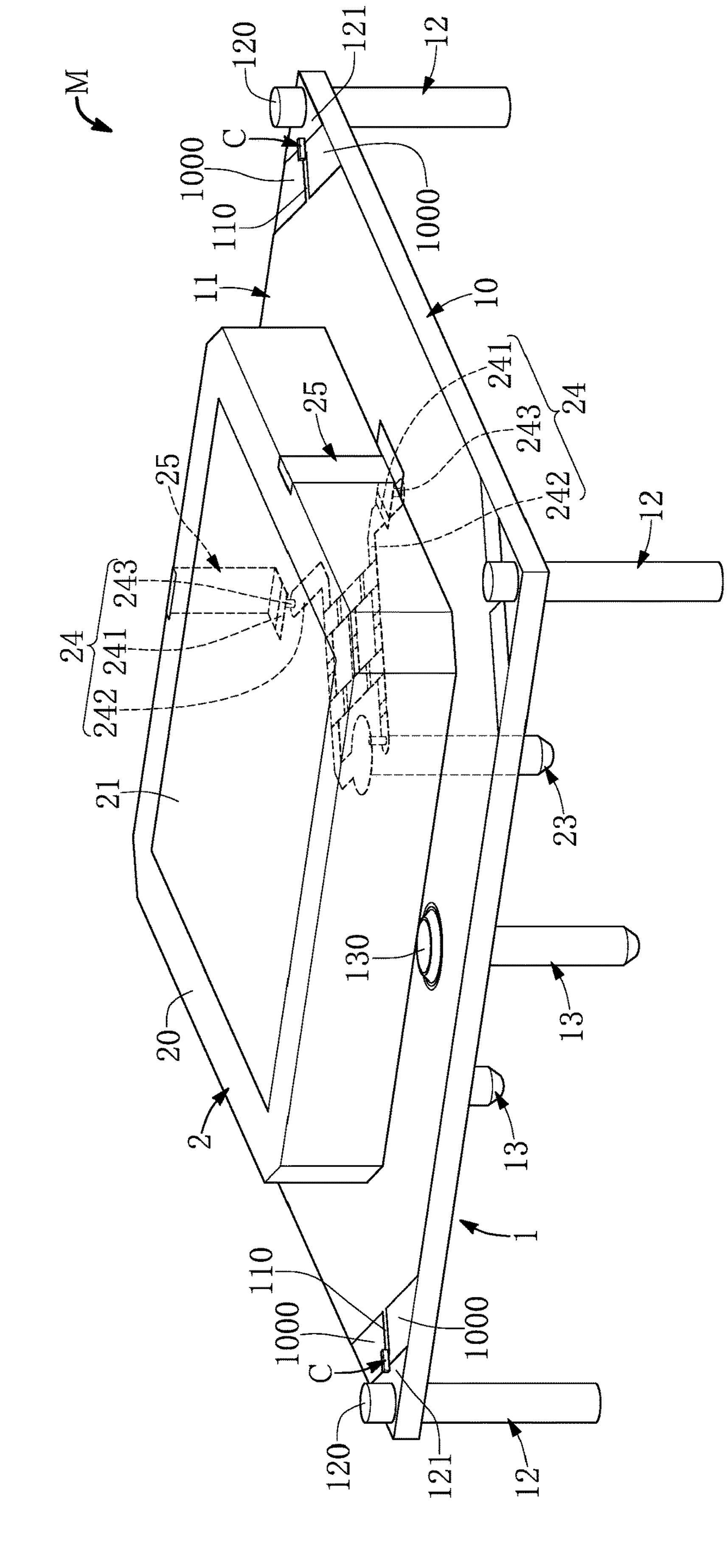
FIG. 13 is a schematic perspective view of the dual-band antenna module according to a fourth embodiment of the present disclosure.
Figure 14:
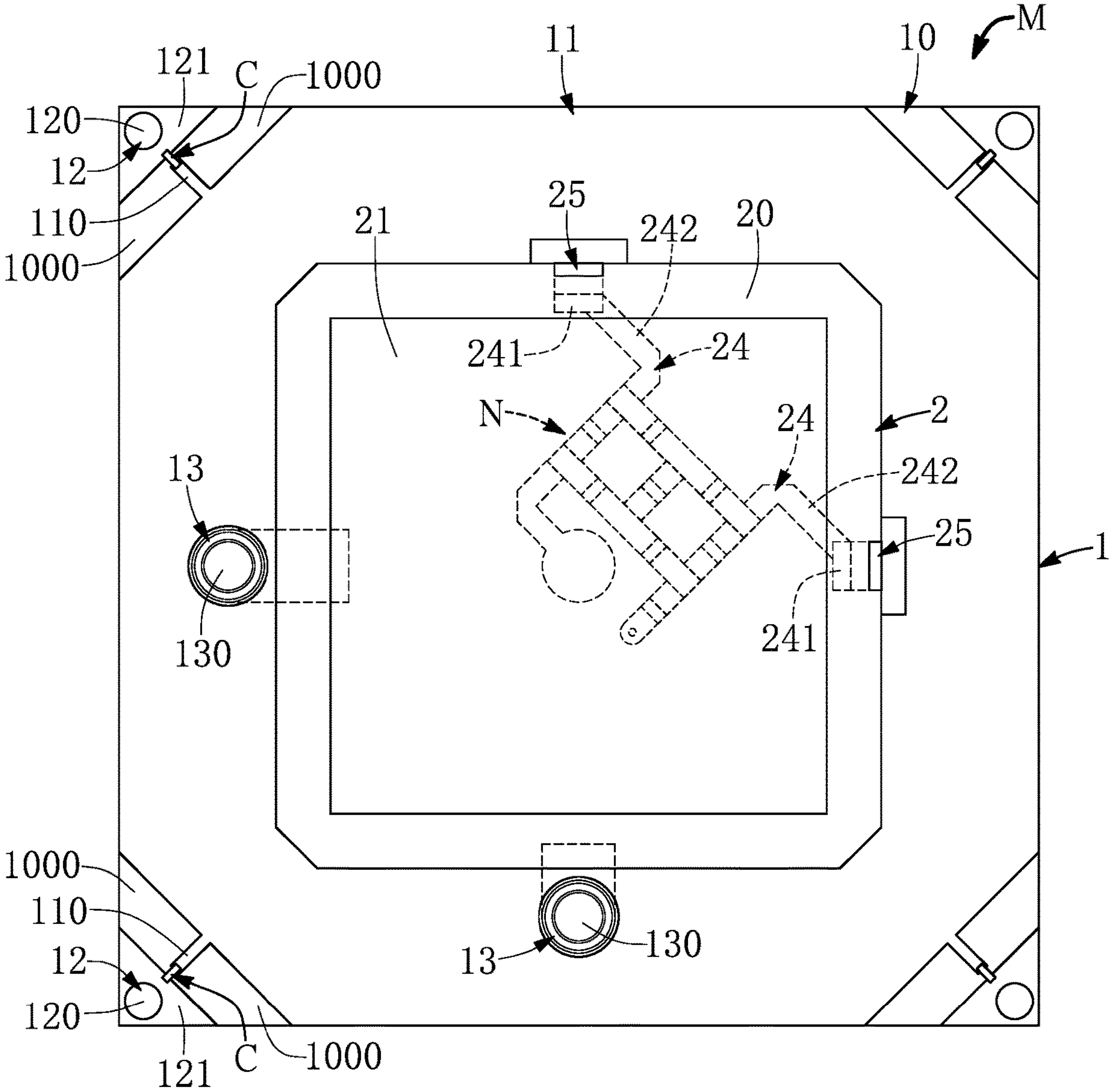
FIG. 14 is a schematic top view of the dual-band antenna module according to the fourth embodiment of the present disclosure.
Figure 15:
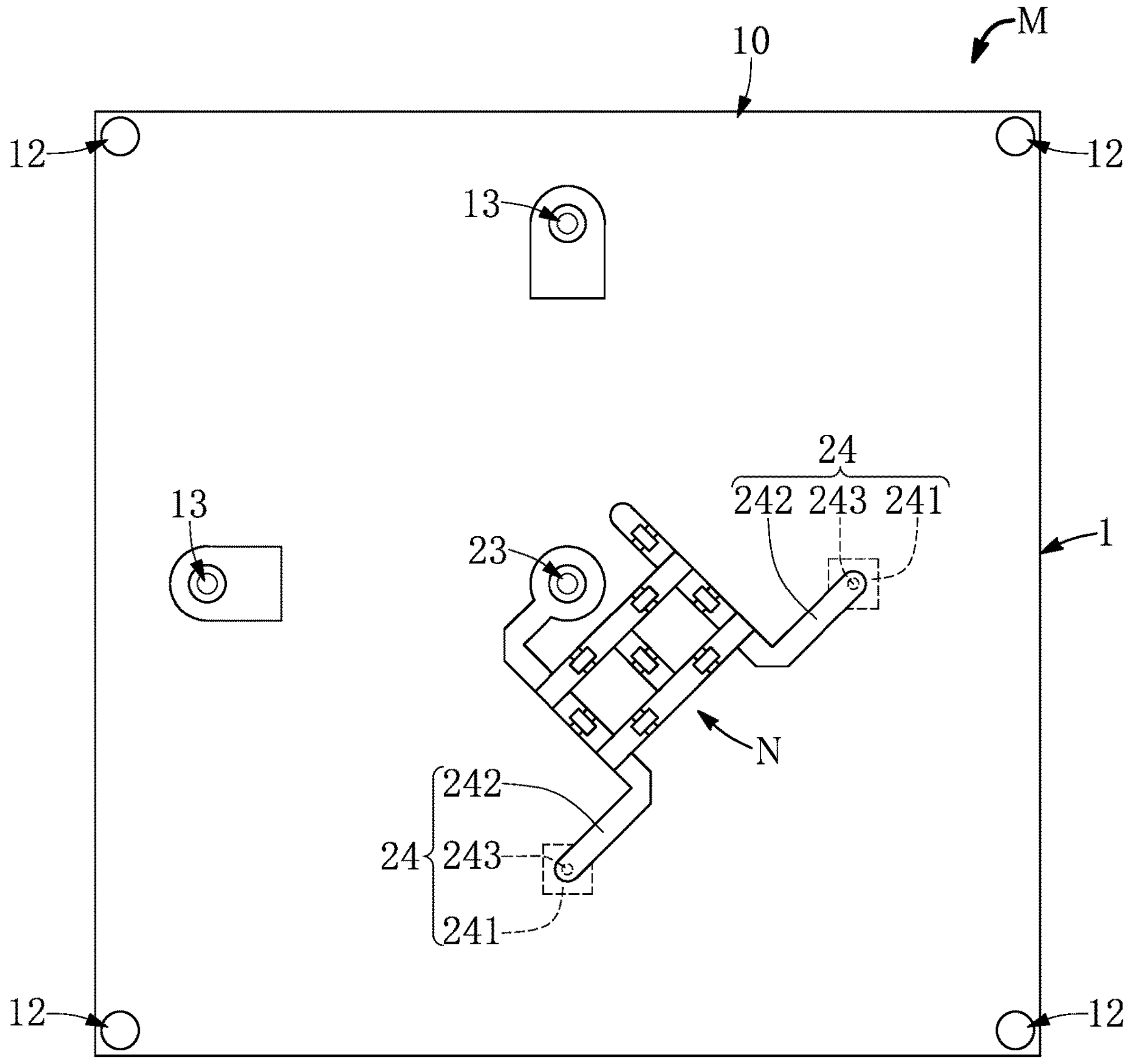
FIG. 15 is a schematic bottom view of the dual-band antenna module according to the fourth embodiment of the present disclosure.

Referring to FIG. 13 to FIG. 15, a fourth embodiment of the present disclosure provides a dual-band antenna module M, which includes a first antenna structure 1 (such as a linearly polarized antenna, a left-hand circularly polarized antenna, or a right-handed circularly polarized antenna) and a second antenna structure 2. Therefore, the first antenna structure 1 can be configured for transmitting or receiving a first frequency band signal (such as the signal in the frequency band between 1163 MHz and 1229 MHz), the second antenna structure 2 can be configured for transmitting or receiving a second frequency band signal (such as the signal in the frequency band between 1557 MHz and 1607 MHz), and the first frequency band signal (i.e., a low frequency mode provided by the first antenna structure 1) that is transmitted or received by the first antenna structure 1 is smaller than the second frequency band signal (i.e., a high frequency mode provided by the first antenna structure 1) that is transmitted or received by the second antenna structure 2. However, the aforementioned details are disclosed for exemplary purposes only, and are not meant to limit the scope of the present disclosure.

Comparing FIGS. 13 to 15 with FIGS. 10 to 12, the main difference between the fourth embodiment and the third embodiment is as follows: in the fourth embodiment, the first antenna structure 1 includes another first feeding pin 13 separate from the first feeding pin 13, and the another first feeding pin 13 passes through the first insulating substrate 10 and is separate from the conductive metal layer 11. In addition, the second antenna structure 2 includes another auxiliary conductive element 24 separate from the auxiliary conductive element 24, and another coupling metal layer 25 separate from the coupling metal layer 25, the another auxiliary conductive element 24 penetrates the first insulating substrate 10 and is separate from the conductive metal layer 11, and the another coupling metal layer 25 is disposed on another lateral side of the second insulating substrate 20 and is separate from the top metal layer 21 and the bottom metal layer 22.

More particularly, referring to FIG. 13 to FIG. 15, when the dual-band antenna module M is disposed on a circuit substrate (not shown in drawings), the two first feeding pins 13, the second feeding pin 23 and the grounding supports 12 are electrically connected to the circuit substrate (not shown in drawings). In addition, the two coupling metal layers 25 (such as two U-shaped coupling metal layers 25) can extend from the top side of the second insulating substrate 20 to the bottom side of the second insulating substrate 20 so as to respectively and electrically contact the two auxiliary conductive elements 24. Moreover, each of the auxiliary conductive elements 24 has a top conductive portion 241, a bottom conductive portion 242 and a conductive penetration portion 243. The top conductive portion 241 is disposed on the top side of the first insulating substrate 10 to electrically contact a corresponding one of the two coupling metal layers 25, the bottom conductive portion 242 is disposed on the bottom side of the first insulating substrate 10 to electrically contact the second feeding pin 23 through a matching circuit N (for example, a 90-degree phase difference network including a plurality of inductors and/or capacitors can serve as the matching circuit N, and the 90-degree phase difference network can also be provided on the circuit substrate), and the conductive penetration portion 243 penetrates the first insulating substrate 10 and is electrically connected between the top conductive portion 241 and the bottom conductive portion 242. Furthermore, each of the first feeding pins 13 has a first exposed portion 130 exposed from the top side of the first insulating substrate 10. However, the aforementioned details are disclosed for exemplary purposes only, and are not meant to limit the scope of the present disclosure.

Fifth Embodiment

Figure 16:
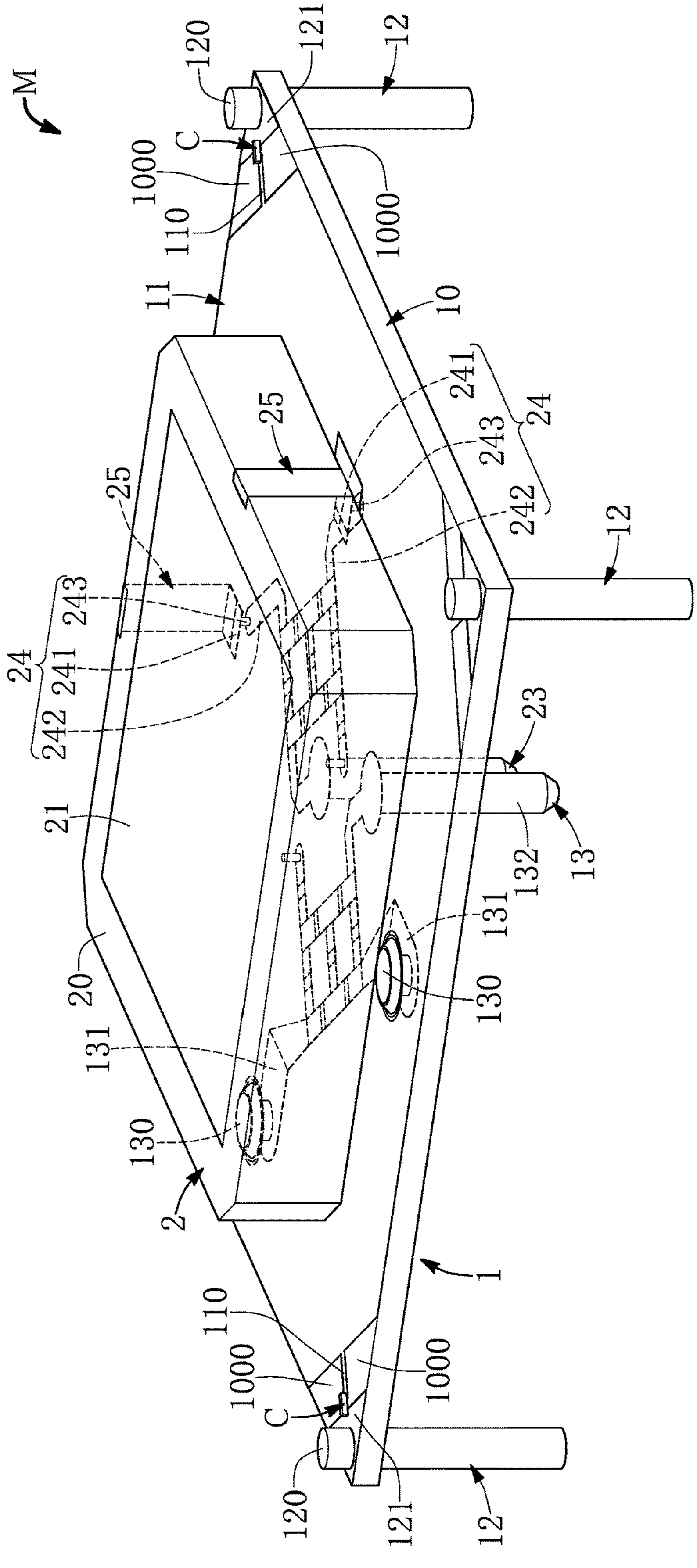
FIG. 16 is a schematic perspective view of the dual-band antenna module according to a fifth embodiment of the present disclosure.
Figure 17:
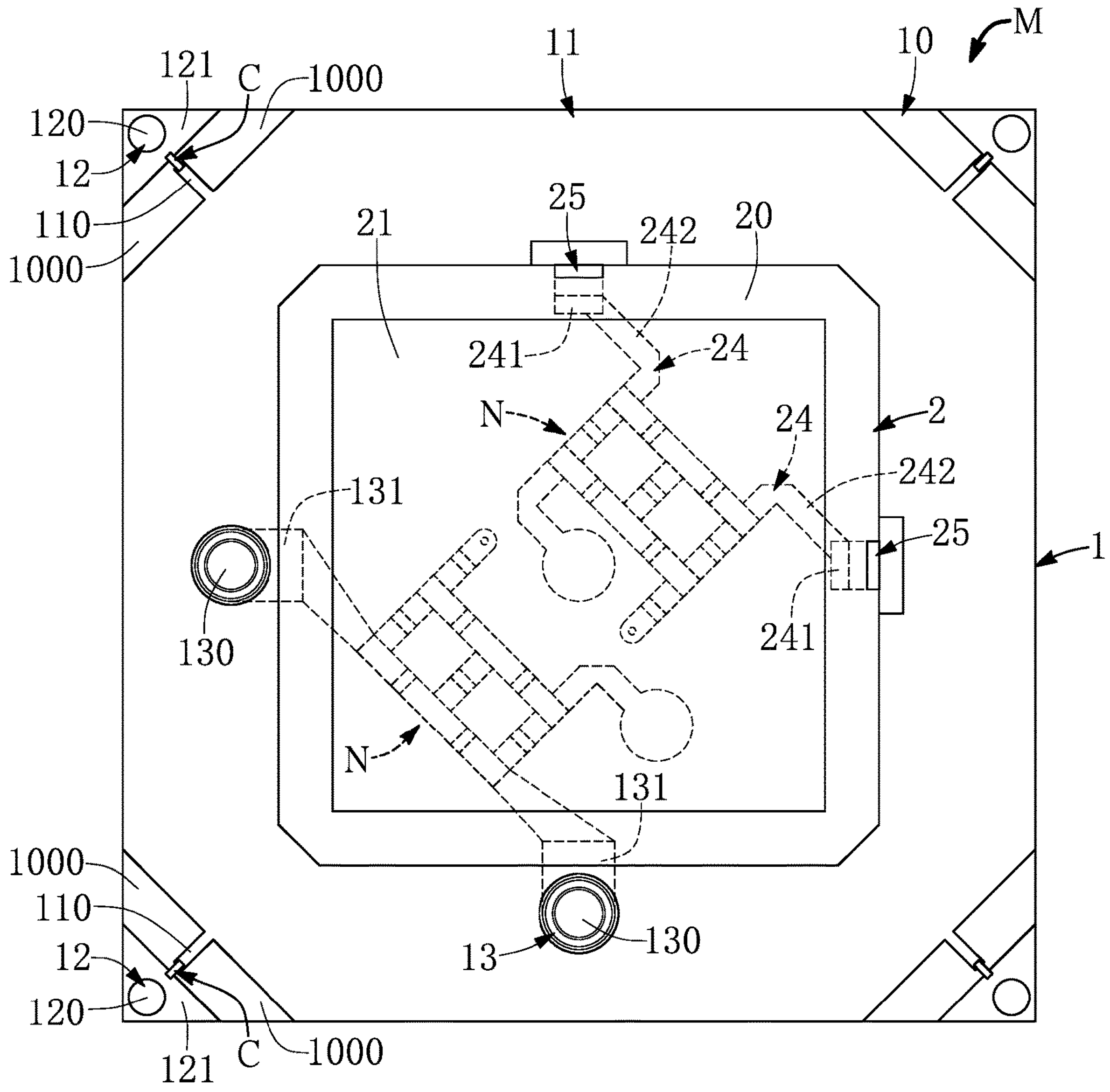
FIG. 17 is a schematic top view of the dual-band antenna module according to the fifth embodiment of the present disclosure.
Figure 18:
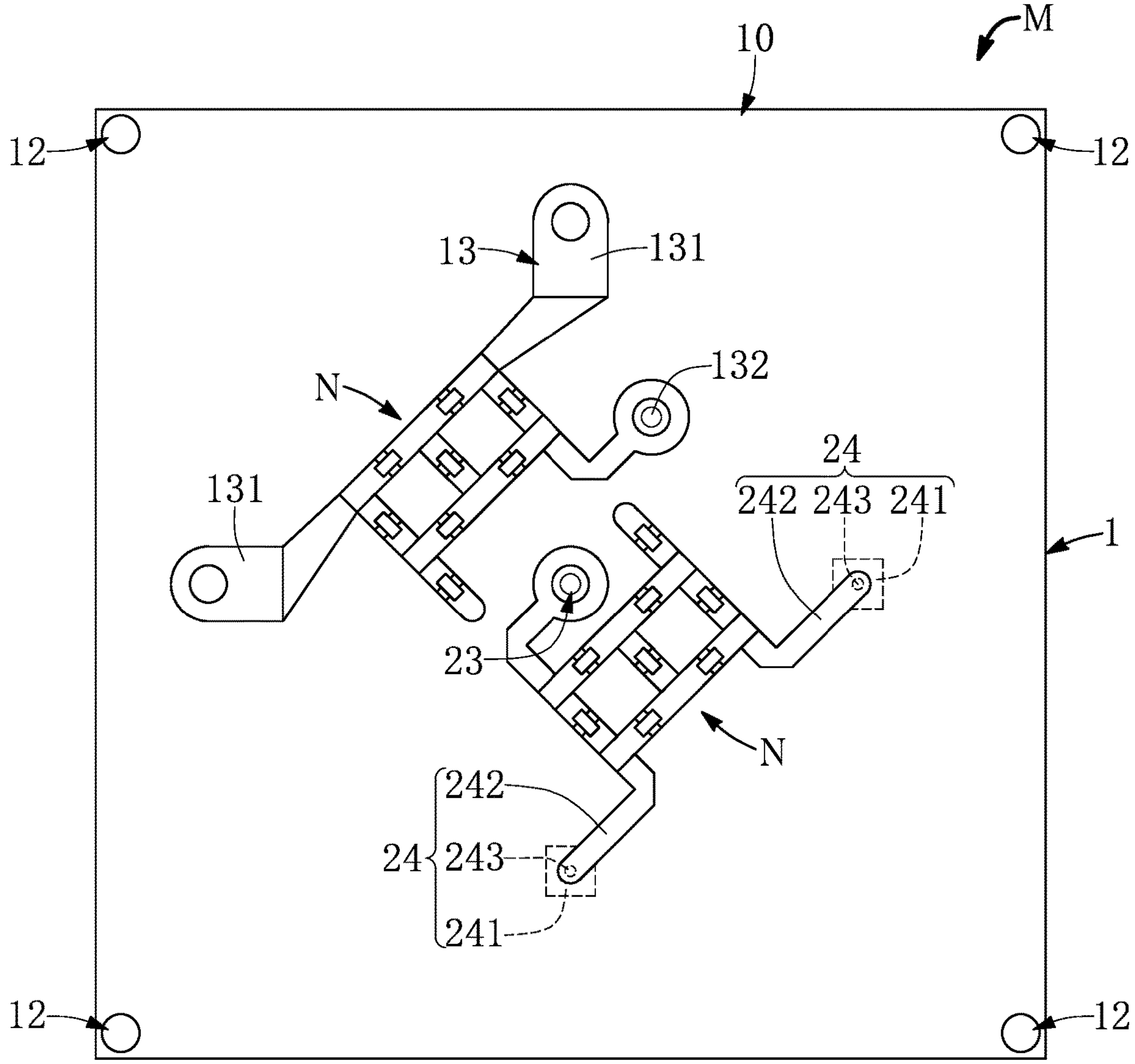
FIG. 18 is a schematic bottom view of the dual-band antenna module according to the fifth embodiment of the present disclosure.

Referring to FIG. 16 to FIG. 18, a fifth embodiment of the present disclosure provides a dual-band antenna module M, which includes a first antenna structure 1 (such as a linearly polarized antenna, a left-hand circularly polarized antenna, or a right-handed circularly polarized antenna) and a second antenna structure 2. Therefore, the first antenna structure 1 can be configured for transmitting or receiving a first frequency band signal (such as the signal in the frequency band between 1163 MHz and 1229 MHz), the second antenna structure 2 can be configured for transmitting or receiving a second frequency band signal (such as the signal in the frequency band between 1557 MHz and 1607 MHz), and the first frequency band signal (i.e., a low frequency mode provided by the first antenna structure 1) that is transmitted or received by the first antenna structure 1 is smaller than the second frequency band signal (i.e., a high frequency mode provided by the first antenna structure 1) that is transmitted or received by the second antenna structure 2. However, the aforementioned details are disclosed for exemplary purposes only, and are not meant to limit the scope of the present disclosure.

Comparing FIGS. 16 to 18 with FIGS. 13 to 15, the main difference between the fifth embodiment and the fourth embodiment is as follows: in the fifth embodiment, the first feeding pin 13 has two first exposed portions 130, two conductive extending portions 131 and a conductive pin portion 132. The two first exposed portions 130 are exposed from the top side of the first insulating substrate 10, the two conductive extending portions 131 are disposed on the bottom side of the first insulating substrate 10 and respectively and electrically connected to the two first exposed portions 130, and the conductive pin portion 132 is electrically connected to the two conductive extending portions 131 through another matching circuit N (for example, another 90-degree phase difference network including a plurality of inductors and/or capacitors can serve as the another matching circuit N, and the another 90-degree phase difference network can also be provided on the circuit substrate).

Sixth Embodiment

Figure 19:
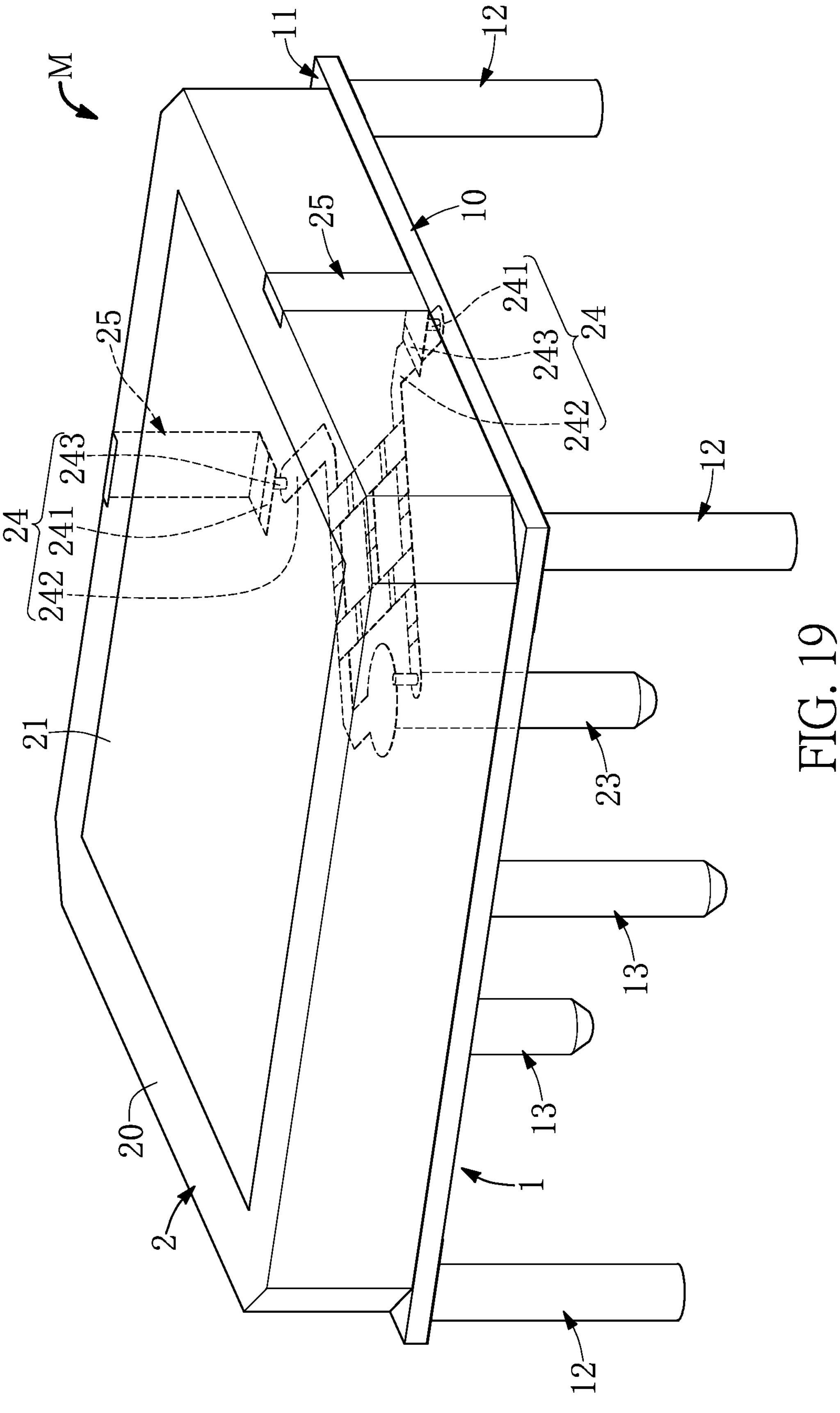
FIG. 19 is a schematic perspective view of the dual-band antenna module according to a sixth embodiment of the present disclosure.
Figure 20:
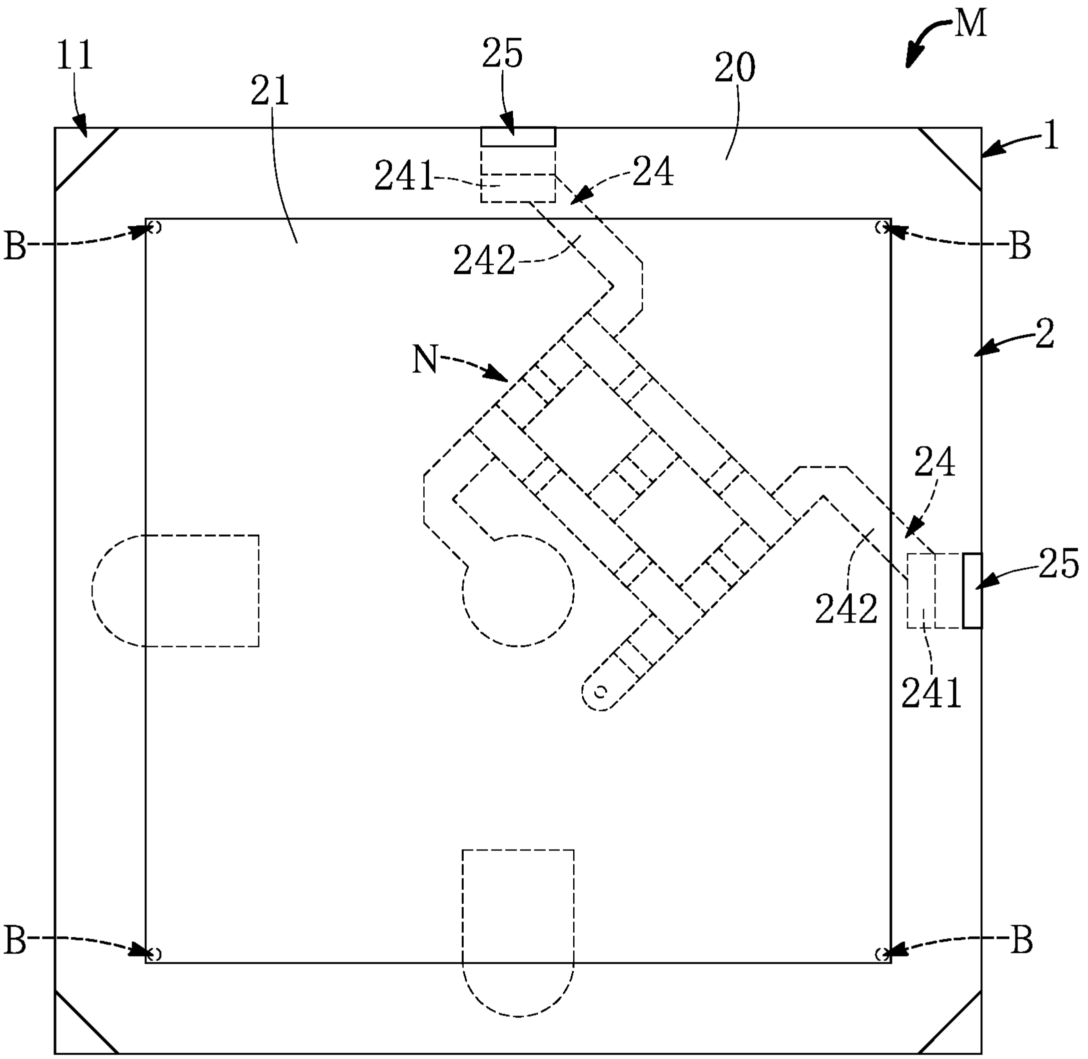
FIG. 20 is a schematic top view of the dual-band antenna module according to the sixth embodiment of the present disclosure.
Figure 21:
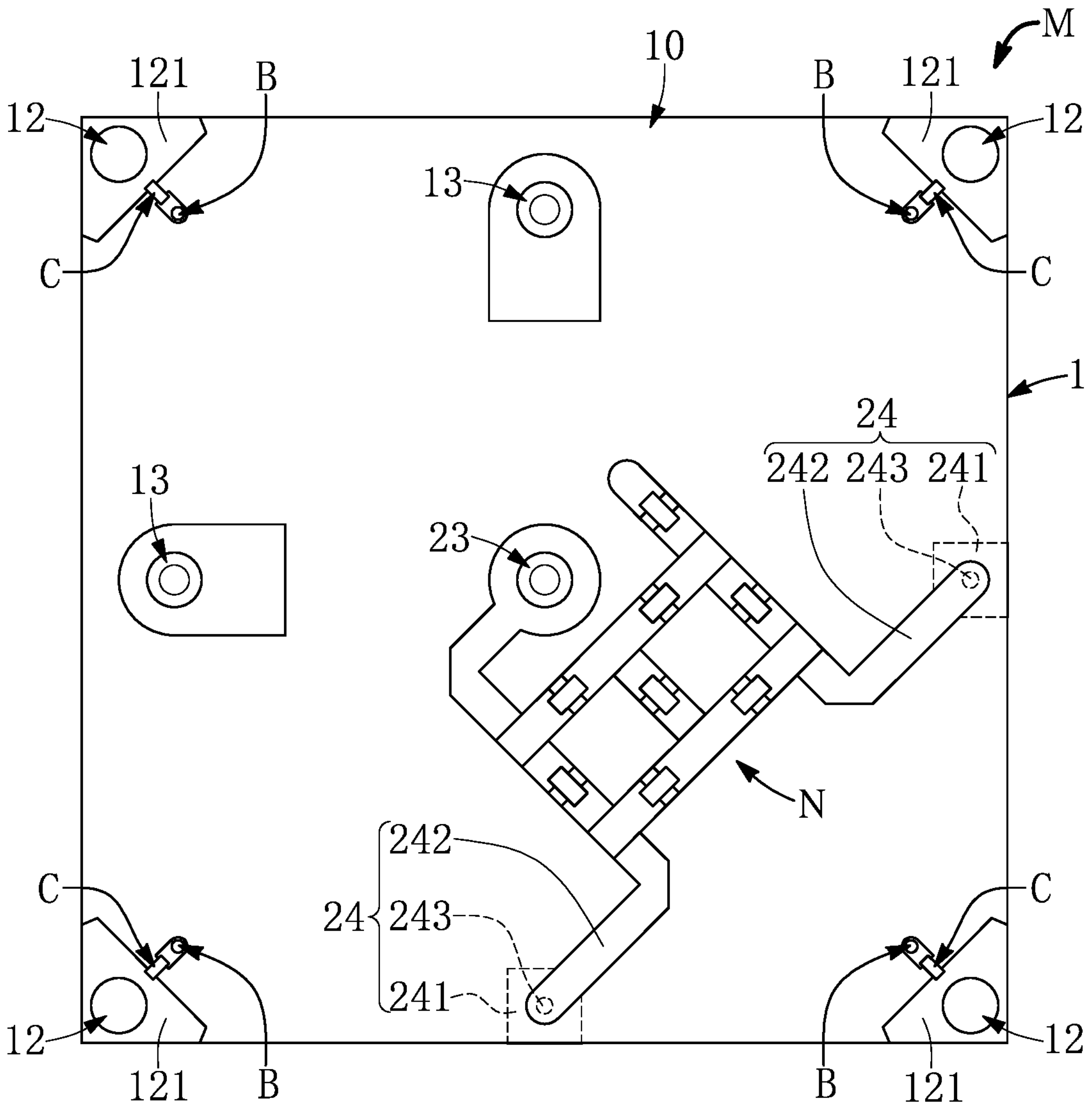
FIG. 21 is a schematic bottom view of the dual-band antenna module according to the sixth embodiment of the present disclosure.

Referring to FIG. 19 to FIG. 21, a sixth embodiment of the present disclosure provides a dual-band antenna module M, which includes a first antenna structure 1 (such as a linearly polarized antenna, a left-hand circularly polarized antenna, or a right-handed circularly polarized antenna) and a second antenna structure 2. The first antenna structure 1 includes a first insulating substrate 10, a conductive metal layer 11, a plurality of grounding supports 12, and a first feeding pin 13, and the second antenna structure 2 includes a second insulating substrate 20, a top metal layer 21, a bottom metal layer 22, a second feeding pin 23, two auxiliary conductive elements 24 and two coupling metal layers 25. Therefore, the first antenna structure 1 can be configured for transmitting or receiving a first frequency band signal (such as the signal in the frequency band between 1163 MHz and 1229 MHz), the second antenna structure 2 can be configured for transmitting or receiving a second frequency band signal (such as the signal in the frequency band between 1557 MHz and 1607 MHz), and the first frequency band signal (i.e., a low frequency mode provided by the first antenna structure 1) that is transmitted or received by the first antenna structure 1 is smaller than the second frequency band signal (i.e., a high frequency mode provided by the first antenna structure 1) that is transmitted or received by the second antenna structure 2. However, the aforementioned details are disclosed for exemplary purposes only, and are not meant to limit the scope of the present disclosure.

More particularly, referring to FIG. 19 to FIG. 21, the conductive metal layer 11 is disposed on a top side of the first insulating substrate 10, the grounding supports 12 are configured to support the first insulating substrate 10 and are separate from the conductive metal layer 11, and the two first feeding pins 13 are disposed on a bottom side of the first insulating substrate 10 and separate from the conductive metal layer 11. In addition, the second insulating substrate 20 is disposed above the first insulating substrate 10, the top metal layer 21 is disposed on a top side of the second insulating substrate 20, the bottom metal layer 22 is disposed on a bottom side of the second insulating substrate 20 to contact the conductive metal layer 11, the two coupling metal layers 25 are respectively disposed on two lateral sides of the second insulating substrate 20 and are separate from the top metal layer 21 and the bottom metal layer 22, each of the two auxiliary conductive elements 24 penetrates through the first insulating substrate 10 and is separate from the conductive metal layer 11, and the second feeding pin 23 is disposed on the bottom side of the first insulating substrate 10 and is electrically connected to the two coupling metal layer 25 through the two auxiliary conductive elements 24, respectively.

For example, referring to FIG. 19 and FIG. 20, a thickness H1 (such as a thickness between 0.4 mm and 2 mm) of the first insulating substrate 10 of the first antenna structure 1 can be substantially equal to ⅓ to ¹⁄₁₀ of a thickness H2 of the second insulating substrate 20 of the second antenna structure 2, and a permittivity of the first insulating substrate 10 (such as any type of antenna carrier substrate that can be used to carry an antenna) of the first antenna structure 1 can be substantially smaller than a permittivity of the second insulating substrate 20 (such as any type of antenna carrier substrate that can be used to carry an antenna) of the second antenna structure 2. In addition, when the dual-band antenna module M is disposed on a circuit substrate (not shown in drawings), the two first feeding pins 13, the second feeding pin 23 and the grounding supports 12 are electrically connected to the circuit substrate (not shown in drawings). Moreover, the grounding supports 12 are disposed between the first insulating substrate 10 and the circuit substrate (not shown in drawings), and the first insulating substrate 10 can be suspended (or supported, or elevated) above the circuit substrate (not shown in drawings) by support of the grounding supports 12 so as to separate the first insulating substrate 10 and the circuit substrate (not shown in drawings) from each other by a predetermined distance. However, the aforementioned details are disclosed for exemplary purposes only, and are not meant to limit the scope of the present disclosure.

For example, referring to FIG. 19 and FIG. 20, the two coupling metal layers 25 (such as two U-shaped coupling metal layers 25) can extend from the top side of the second insulating substrate 20 to the bottom side of the second insulating substrate 20 so as to respectively and electrically contact the two auxiliary conductive elements 24. In addition, the auxiliary conductive element 24 has a top conductive portion 241, a bottom conductive portion 242 and a conductive penetration portion 243, the top conductive portion 241 is disposed on the top side of the first insulating substrate 10 to electrically contact a corresponding one of the two coupling metal layers 25, the bottom conductive portion 242 is disposed on the bottom side of the first insulating substrate 10 to electrically contact the second feeding pin 23, and the conductive penetration portion 243 penetrates the first insulating substrate 10 and is electrically connected between the top conductive portion 241 and the bottom conductive portion 242. However, the aforementioned details are disclosed for exemplary purposes only, and are not meant to limit the scope of the present disclosure.

For example, referring to FIG. 19 and FIG. 21, the first antenna structure 1 includes a plurality of matching elements C (such as inductors or capacitors) disposed on the bottom side of the first insulating substrate 10, and each of the matching elements C is electrically connected between the conductive metal layer 11 and a corresponding one of the grounding supports 12, so that the center frequency of the antenna is matched (it is worth noting that the matching element C can be configured to reduce the frequency). In addition, the grounding supports 12 respectively and electrically contact a plurality of auxiliary conductive layers 121 that are disposed on the bottom side of the first insulating substrate 10, and each of the grounding supports 12 is electrically connected to a corresponding one of the matching elements C through the auxiliary conductive layer 121. Moreover, the conductive metal layer 11 is electrically connected to the matching elements C through a plurality of conductive penetration bodies B respectively, and the conductive penetration bodies B penetrate through the first insulating substrate 10 and respectively extend to electrically contact the matching elements C. It should be noted that each of the grounding supports 12 is not exposed from the top side of the first insulating substrate 10, and the two first feeding pins 13 are not exposed from the top side of the first insulating substrate 10. Furthermore, the matching elements C are disposed on the bottom side of the first insulating substrate 10, so that the areas of the first antenna structure 1 and the second antenna structure 2 in the horizontal direction can be very similar, thereby effectively reducing the size of the first antenna structure 1. However, the aforementioned details are disclosed for exemplary purposes only, and are not meant to limit the scope of the present disclosure.

Beneficial Effects of the Embodiments

In conclusion, in the dual-band antenna module M provided by the present disclosure, by virtue of the grounding supports 12 being configured to support the first insulating substrate 10 and separate from the conductive metal layer 11, and the first frequency band signal that is transmitted or received by the first antenna structure 1 being smaller than the second frequency band signal that is transmitted or received by the second antenna structure 2, the dual-band antenna module M can provide a high frequency mode and a low frequency mode at the same time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual-band antenna module, comprising:

a first antenna structure including a first insulating substrate, a conductive metal layer, a plurality of grounding supports, and a first feeding pin; and a second antenna structure including a second insulating substrate, a top metal layer, a bottom metal layer and a second feeding pin;

wherein the conductive metal layer is disposed on a top side of the first insulating substrate, the grounding supports are configured to support the first insulating substrate and separate from the conductive metal layer, and the first feeding pin passes through the first insulating substrate and is separate from the conductive metal layer;

wherein the second insulating substrate is disposed above the first insulating substrate, the top metal layer is disposed on a top side of the second insulating substrate, the bottom metal layer is disposed on a bottom side of the second insulating substrate and separate from the conductive metal layer, and the second feeding pin passes through the second insulating substrate and the first insulating substrate and is separate from the top metal layer, the bottom metal layer and the conductive metal layer;

wherein the first antenna structure is configured for transmitting or receiving a first frequency band signal, the second antenna structure is configured for transmitting or receiving a second frequency band signal, and the first frequency band signal that is transmitted or received by the first antenna structure is smaller than the second frequency band signal that is transmitted or received by the second antenna structure.

2. The dual-band antenna module according to claim 1, wherein a thickness of the first insulating substrate of the first antenna structure is equal to ⅓ to $1/10$ of a thickness of the second insulating substrate of the second antenna structure, and a permittivity of the first insulating substrate of the first antenna structure is smaller than a permittivity of the second insulating substrate of the second antenna structure;

wherein, when the dual-band antenna module is disposed on a circuit substrate, the first feeding pin, the second feeding pin and the grounding supports are electrically connected to the circuit substrate;

wherein the grounding supports are disposed between the first insulating substrate and the circuit substrate, the first insulating substrate is suspended above the circuit substrate by support of the grounding supports so as to separate the first insulating substrate and the circuit substrate from each other by a predetermined distance, and the second insulating substrate is suspended above the first insulating substrate by support of the second feeding pins so as to separate the second insulating substrate and the first insulating substrate from each other by a predetermined distance;

wherein the second feeding pin includes a first conductive portion, a second conductive portion and a third conductive portion, the first conductive portion penetrates through the second insulating substrate and is separate from the top metal layer and the bottom metal layer, the second conductive portion is disposed below the first insulating substrate and is separate from the conductive metal layer, and the third conductive portion penetrates through the first insulating substrate and is electrically connected between the first conductive portion and the second conductive portion;

wherein the first antenna structure includes a plurality of matching elements disposed on the top side of the first insulating substrate, and each of the matching elements is electrically connected between the conductive metal layer and a corresponding one of the grounding supports;

wherein the grounding supports respectively and electrically contact a plurality of auxiliary conductive layers that are disposed on the top side of the first insulating substrate, and each of the grounding supports is electrically connected to a corresponding one of the matching elements through the auxiliary conductive layer;

wherein the conductive metal layer has a plurality of conductive extending portions respectively corresponding to the grounding supports, and the conductive metal layer is electrically connected to the matching elements through the conductive extending portions respectively;

wherein the first insulating substrate has a plurality of unoccupied areas formed on the top side thereof, each of the unoccupied areas is formed between the conductive metal layer and a corresponding one of the auxiliary conductive layers, and each of the conductive extending portions of the conductive metal layer is disposed between two adjacent ones of the unoccupied areas;

wherein, a top exposed portion of each of the grounding supports is exposed from the top side of the first insulating substrate, the first feeding pin has a first exposed portion exposed from the top side of the first insulating substrate, and the second feeding pin has a second exposed portion exposed from the top side of the second insulating substrate.

3. The dual-band antenna module according to claim 1, wherein the first antenna structure includes another first feeding pin separate from the first feeding pin, and the another first feeding pin passes through the first insulating substrate and is separate from the conductive metal layer;

wherein the second antenna structure includes another second feeding pin separate from the second feeding pin, and the another second feeding pin passes through the second insulating substrate and the first insulating substrate and is separate from the top metal layer, the bottom metal layer and the conductive metal layer;

wherein a thickness of the first insulating substrate of the first antenna structure is equal to ⅓ to 1/10 of a thickness of the second insulating substrate of the second antenna structure, and a permittivity of the first insulating substrate of the first antenna structure is smaller than a permittivity of the second insulating substrate of the second antenna structure;

wherein, when the dual-band antenna module is disposed on a circuit substrate, the two first feeding pins, the two second feeding pins and the grounding supports are electrically connected to the circuit substrate;

wherein the grounding supports are disposed between the first insulating substrate and the circuit substrate, the first insulating substrate is suspended above the circuit substrate by support of the grounding supports so as to separate the first insulating substrate and the circuit substrate from each other by a predetermined distance, and the second insulating substrate is suspended above the first insulating substrate by support of the two second feeding pins so as to separate the second insulating substrate and the first insulating substrate from each other by a predetermined distance;

wherein the first antenna structure includes a plurality of matching elements disposed on the top side of the first insulating substrate, and each of the matching elements is electrically connected between the conductive metal layer and a corresponding one of the grounding supports;

wherein the grounding supports respectively and electrically contact a plurality of auxiliary conductive layers that are disposed on the top side of the first insulating substrate, and each of the grounding supports is electrically connected to a corresponding one of the matching elements through the auxiliary conductive layer;

wherein the conductive metal layer has a plurality of conductive extending portions respectively corresponding to the grounding supports, and the conductive metal layer is electrically connected to the matching elements through the conductive extending portions respectively;

wherein the first insulating substrate has a plurality of unoccupied areas formed on the top side thereof, each of the unoccupied areas is formed between the conductive metal layer and a corresponding one of the auxiliary conductive layers, and each of the conductive extending portions of the conductive metal layer is disposed between two adjacent ones of the unoccupied areas;

wherein, a top exposed portion of each of the grounding supports is exposed from the top side of the first insulating substrate, each of the two first feeding pins has a first exposed portion exposed from the top side of the first insulating substrate, and each of the two second feeding pins has a second exposed portion exposed from the top side of the second insulating substrate.

4. A dual-band antenna module, comprising:

a first antenna structure including a first insulating substrate, a conductive metal layer, a plurality of grounding supports, and a first feeding pin; and a second antenna structure including a second insulating substrate, a top metal layer, a bottom metal layer, a second feeding pin, an auxiliary conductive element and a coupling metal layer;

wherein the conductive metal layer is disposed on a top side of the first insulating substrate, the grounding supports are configured to support the first insulating substrate and separate from the conductive metal layer, and the first feeding pin passes through the first insulating substrate and is separate from the conductive metal layer;

wherein the second insulating substrate is disposed above the first insulating substrate, the top metal layer is disposed on a top side of the second insulating substrate, the bottom metal layer is disposed on a bottom side of the second insulating substrate to contact the conductive metal layer, the coupling metal layer is disposed on a lateral side of the second insulating substrate and is separate from the top metal layer and the bottom metal layer, the auxiliary conductive element penetrates through the first insulating substrate and is separate from the conductive metal layer, and the second feeding pin is disposed on a bottom side of the first insulating substrate and is electrically connected to the coupling metal layer through the auxiliary conductive element;

wherein the first antenna structure is configured for transmitting or receiving a first frequency band signal, the second antenna structure is configured for transmitting or receiving a second frequency band signal, and the first frequency band signal that is transmitted or received by the first antenna structure is smaller than the second frequency band signal that is transmitted or received by the second antenna structure.

5. The dual-band antenna module according to claim 4, wherein a thickness of the first insulating substrate of the first antenna structure is equal to ⅓ to 1/10 of a thickness of the second insulating substrate of the second antenna structure, and a permittivity of the first insulating substrate of the first antenna structure is smaller than a permittivity of the second insulating substrate of the second antenna structure;

wherein, when the dual-band antenna module is disposed on a circuit substrate, the first feeding pin, the second feeding pin and the grounding supports are electrically connected to the circuit substrate;

wherein the grounding supports are disposed between the first insulating substrate and the circuit substrate, and the first insulating substrate is suspended above the circuit substrate by support of the grounding supports so as to separate the first insulating substrate and the circuit substrate from each other by a predetermined distance;

wherein the coupling metal layer extends from the top side of the second insulating substrate to the bottom side of the second insulating substrate to electrically contact the auxiliary conductive element;

wherein the auxiliary conductive element has a top conductive portion, a bottom conductive portion and a conductive penetration portion, the top conductive portion is disposed on the top side of the first insulating substrate to electrically contact the coupling metal layer, the bottom conductive portion is disposed on the bottom side of the first insulating substrate to electrically contact the second feeding pin, and the conductive penetration portion penetrates the first insulating substrate and is electrically connected between the top conductive portion and the bottom conductive portion;

wherein the first antenna structure includes a plurality of matching elements disposed on the top side of the first insulating substrate, and each of the matching elements is electrically connected between the conductive metal layer and a corresponding one of the grounding supports;

wherein the grounding supports respectively and electrically contact a plurality of auxiliary conductive layers that are disposed on the top side of the first insulating substrate, and each of the grounding supports is electrically connected to a corresponding one of the matching elements through the auxiliary conductive layer;

wherein the conductive metal layer has a plurality of conductive extending portions respectively corresponding to the grounding supports, and the conductive metal layer is electrically connected to the matching elements through the conductive extending portions respectively;

wherein the first insulating substrate has a plurality of unoccupied areas formed on the top side thereof, each of the unoccupied areas is formed between the conductive metal layer and a corresponding one of the auxiliary conductive layers, and each of the conductive extending portions of the conductive metal layer is disposed between two adjacent ones of the unoccupied areas;

wherein, a top exposed portion of each of the grounding supports is exposed from the top side of the first insulating substrate, and the first feeding pin has a first exposed portion exposed from the top side of the first insulating substrate.

6. The dual-band antenna module according to claim 4, wherein the first antenna structure includes another first feeding pin separate from the first feeding pin, and the another first feeding pin passes through the first insulating substrate and is separate from the conductive metal layer;

wherein the second antenna structure includes another auxiliary conductive element separate from the auxiliary conductive element, and another coupling metal layer separate from the coupling metal layer, the another auxiliary conductive element penetrates the first insulating substrate and is separate from the conductive metal layer, and the another coupling metal layer is disposed on another lateral side of the second insulating substrate and is separate from the top metal layer and the bottom metal layer;

wherein a thickness of the first insulating substrate of the first antenna structure is equal to ⅓ to 1/10 of a thickness of the second insulating substrate of the second antenna structure, and a permittivity of the first insulating substrate of the first antenna structure is smaller than a permittivity of the second insulating substrate of the second antenna structure;

wherein, when the dual-band antenna module is disposed on a circuit substrate, the two first feeding pins, the second feeding pin and the grounding supports are electrically connected to the circuit substrate;

wherein the grounding supports are disposed between the first insulating substrate and the circuit substrate, and the first insulating substrate is suspended above the circuit substrate by support of the grounding supports so as to separate the first insulating substrate and the circuit substrate from each other by a predetermined distance;

wherein the two coupling metal layers extend from the top side of the second insulating substrate to the bottom side of the second insulating substrate to respectively and electrically contact the two auxiliary conductive elements;

wherein each of the auxiliary conductive elements has a top conductive portion, a bottom conductive portion and a conductive penetration portion, the top conductive portion is disposed on the top side of the first insulating substrate to electrically contact a corresponding one of the two coupling metal layers, the bottom conductive portion is disposed on the bottom side of the first insulating substrate to electrically contact the second feeding pin through a matching circuit, and the conductive penetration portion penetrates the first insulating substrate and is electrically connected between the top conductive portion and the bottom conductive portion;

wherein the first antenna structure includes a plurality of matching elements disposed on the top side of the first insulating substrate, and each of the matching elements is electrically connected between the conductive metal layer and a corresponding one of the grounding supports;

wherein the grounding supports respectively and electrically contact a plurality of auxiliary conductive layers that are disposed on the top side of the first insulating substrate, and each of the grounding supports is electrically connected to a corresponding one of the matching elements through the auxiliary conductive layer;

wherein the conductive metal layer has a plurality of conductive extending portions respectively corresponding to the grounding supports, and the conductive metal layer is electrically connected to the matching elements through the conductive extending portions respectively;

wherein the first insulating substrate has a plurality of unoccupied areas formed on the top side thereof, each of the unoccupied areas is formed between the conductive metal layer and a corresponding one of the auxiliary conductive layers, and each of the conductive extending portions of the conductive metal layer is disposed between two adjacent ones of the unoccupied areas;

wherein, a top exposed portion of each of the grounding supports is exposed from the top side of the first insulating substrate, and each of the first feeding pins has a first exposed portion exposed from the top side of the first insulating substrate.

7. The dual-band antenna module according to claim 4, wherein the second antenna structure includes another auxiliary conductive element separate from the auxiliary conductive element, and another coupling metal layer separate from the coupling metal layer, the another auxiliary conductive element penetrates the first insulating substrate and is separate from the conductive metal layer, and the another coupling metal layer is disposed on another lateral side of the second insulating substrate and is separate from the top metal layer and the bottom metal layer;

wherein a thickness of the first insulating substrate of the first antenna structure is equal to ⅓ to 1/10 of a thickness of the second insulating substrate of the second antenna structure, and a permittivity of the first insulating substrate of the first antenna structure is smaller than a permittivity of the second insulating substrate of the second antenna structure;

wherein, when the dual-band antenna module is disposed on a circuit substrate, the first feeding pin, the second feeding pin and the grounding supports are electrically connected to the circuit substrate;

wherein the grounding supports are disposed between the first insulating substrate and the circuit substrate, and the first insulating substrate is suspended above the circuit substrate by support of the grounding supports so as to separate the first insulating substrate and the circuit substrate from each other by a predetermined distance;

wherein the two coupling metal layers extend from the top side of the second insulating substrate to the bottom side of the second insulating substrate to respectively and electrically contact the two auxiliary conductive elements;

wherein each of the auxiliary conductive elements has a top conductive portion, a bottom conductive portion and a conductive penetration portion, the top conductive portion is disposed on the top side of the first insulating substrate to electrically contact a corresponding one of the two coupling metal layers, the bottom conductive portion is disposed on the bottom side of the first insulating substrate to electrically contact the second feeding pin through a matching circuit, and the conductive penetration portion penetrates the first insulating substrate and is electrically connected between the top conductive portion and the bottom conductive portion;

wherein the first antenna structure includes a plurality of matching elements disposed on the top side of the first insulating substrate, and each of the matching elements is electrically connected between the conductive metal layer and a corresponding one of the grounding supports;

wherein the grounding supports respectively and electrically contact a plurality of auxiliary conductive layers that are disposed on the top side of the first insulating substrate, and each of the grounding supports is electrically connected to a corresponding one of the matching elements through the auxiliary conductive layer;

wherein the conductive metal layer has a plurality of conductive extending portions respectively corresponding to the grounding supports, and the conductive metal layer is electrically connected to the matching elements through the conductive extending portions respectively;

wherein the first insulating substrate has a plurality of unoccupied areas formed on the top side thereof, each of the unoccupied areas is formed between the conductive metal layer and a corresponding one of the auxiliary conductive layers, and each of the conductive extending portions of the conductive metal layer is disposed between two adjacent ones of the unoccupied areas;

wherein, a top exposed portion of each of the grounding supports is exposed from the top side of the first insulating substrate, and the first feeding pin has two first exposed portions exposed from the top side of the first insulating substrate, two conductive extending portions disposed on the bottom side of the first insulating substrate and respectively and electrically connected to the two first exposed portions, and a conductive pin portion electrically connected to the two conductive extending portions through another matching circuit.

8. A dual-band antenna module, comprising:

a first antenna structure including a first insulating substrate, a conductive metal layer, a plurality of grounding supports, and two first feeding pins; and a second antenna structure including a second insulating substrate, a top metal layer, a bottom metal layer, a second feeding pin, two auxiliary conductive elements and two coupling metal layers;

wherein the conductive metal layer is disposed on a top side of the first insulating substrate, the grounding supports are configured to support the first insulating substrate and separate from the conductive metal layer, and the two first feeding pins are disposed on a bottom side of the first insulating substrate and separate from the conductive metal layer;

wherein the second insulating substrate is disposed above the first insulating substrate, the top metal layer is disposed on a top side of the second insulating substrate, the bottom metal layer is disposed on a bottom side of the second insulating substrate to contact the conductive metal layer, the two coupling metal layers are respectively disposed on two lateral sides of the second insulating substrate and are separate from the top metal layer and the bottom metal layer, each of the two auxiliary conductive elements penetrates through the first insulating substrate and is separate from the conductive metal layer, and the second feeding pin is disposed on the bottom side of the first insulating substrate and is electrically connected to the two coupling metal layer through the two auxiliary conductive elements, respectively;

wherein the first antenna structure is configured for transmitting or receiving a first frequency band signal, the second antenna structure is configured for transmitting or receiving a second frequency band signal, and the first frequency band signal that is transmitted or received by the first antenna structure is smaller than the second frequency band signal that is transmitted or received by the second antenna structure.

9. The dual-band antenna module according to claim 8, wherein a thickness of the first insulating substrate of the first antenna structure is equal to ⅓ to 1/10 of a thickness of the second insulating substrate of the second antenna structure, and a permittivity of the first insulating substrate of the first antenna structure is smaller than a permittivity of the second insulating substrate of the second antenna structure;

wherein, when the dual-band antenna module is disposed on a circuit substrate, the two first feeding pin, the second feeding pin and the grounding supports are electrically connected to the circuit substrate;

wherein the grounding supports are disposed between the first insulating substrate and the circuit substrate, and the first insulating substrate is suspended above the circuit substrate by support of the grounding supports so as to separate the first insulating substrate and the circuit substrate from each other by a predetermined distance;

wherein the two coupling metal layers extend from the top side of the second insulating substrate to the bottom side of the second insulating substrate to respectively and electrically contact the two auxiliary conductive elements;

wherein each of the two auxiliary conductive elements has a top conductive portion, a bottom conductive portion and a conductive penetration portion, the top conductive portion is disposed on the top side of the first insulating substrate to electrically contact a corresponding one of the two coupling metal layers, the bottom conductive portion is disposed on the bottom side of the first insulating substrate to electrically contact the second feeding pin, and the conductive penetration portion penetrates the first insulating substrate and is electrically connected between the top conductive portion and the bottom conductive portion;

wherein the first antenna structure includes a plurality of matching elements disposed on the bottom side of the first insulating substrate, and each of the matching elements is electrically connected between the conductive metal layer and a corresponding one of the grounding supports;

wherein the grounding supports respectively and electrically contact a plurality of auxiliary conductive layers that are disposed on the bottom side of the first insulating substrate, and each of the grounding supports is electrically connected to a corresponding one of the matching elements through the auxiliary conductive layer;

wherein the conductive metal layer is electrically connected to the matching elements through a plurality of conductive penetration bodies respectively, and the conductive penetration bodies penetrate through the first insulating substrate and respectively extend to electrically contact the matching elements;

wherein each of the grounding supports is not exposed from the top side of the first insulating substrate, and the two first feeding pins are not exposed from the top side of the first insulating substrate.

* * * * *